United States Patent
Jiang et al.

(10) Patent No.: US 10,785,736 B2
(45) Date of Patent: Sep. 22, 2020

(54) SYSTEM AND METHOD THAT FACILITATES A COEXISTENCE OF FIFTH GENERATION NEW RADIO RESOURCE TECHNOLOGY WITH NARROWBAND INTERNET-OF-THINGS TECHNOLOGY

(71) Applicant: QUALCOMM Incorporated, San Diego, CA (US)

(72) Inventors: Jing Jiang, San Diego, CA (US); Hao Xu, Beijing (CN); Wanshi Chen, San Diego, CA (US); June Namgoong, San Diego, CA (US); Yang Yang, San Diego, CA (US); Haitong Sun, San Diego, CA (US); Alexandros Manolakos, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/663,610

(22) Filed: Jul. 28, 2017

(65) Prior Publication Data
US 2018/0098293 A1    Apr. 5, 2018

Related U.S. Application Data

(60) Provisional application No. 62/403,670, filed on Oct. 3, 2016.

(51) Int. Cl.
*H04W 56/00* (2009.01)
*H04L 27/26* (2006.01)
(Continued)

(52) U.S. Cl.
CPC .......... *H04W 56/002* (2013.01); *H04L 7/041* (2013.01); *H04L 27/0014* (2013.01);
(Continued)

(58) Field of Classification Search
None
See application file for complete search history.

(56) References Cited

U.S. PATENT DOCUMENTS

2017/0156140 A1 *  6/2017  Islam ................... H04L 5/0044
2017/0208592 A1 *  7/2017  Rico Alvarino ........ H04W 4/70
(Continued)

OTHER PUBLICATIONS

Wang et al. "A Primer on 3GPP Narrowband Internet of Things NB-IoT" IEEE Communication Magazine Mar. 2017 (Year: 2017).*
(Continued)

*Primary Examiner* — Jeffrey M Rutkowski
*Assistant Examiner* — Basil Ma
(74) *Attorney, Agent, or Firm* — Steven R. Thiel

(57) ABSTRACT

Aspects of the disclosure relate to a coexistence of a first radio access technology (RAT), such as a fifth generation (5G) new radio (NR) technology with a second RAT, such as a narrow-band internet-of-things (NB-IOT) technology. In a first aspect, a 5G NR resource block size and an NB-IOT resource block size are defined, and a compatible alignment of an NB-IOT resource block and a 5G NR resource block is identified. An offset associated with the compatible alignment is then determined in which the offset is within a threshold offset and facilitates an identification of a valid NB-IOT resource block. In a second aspect, an offset associated with a compatible alignment of a 5G NR resource block and an NB-IOT resource block is ascertained, and a channel raster is shifted according to the offset associated with the compatible alignment.

28 Claims, 19 Drawing Sheets

(51) Int. Cl.

| | |
|---|---|
| *H04L 27/00* | (2006.01) |
| *H04L 7/04* | (2006.01) |
| *H04W 16/14* | (2009.01) |
| *H04W 84/04* | (2009.01) |
| *H04J 3/06* | (2006.01) |
| *H04L 27/38* | (2006.01) |
| *H04W 36/00* | (2009.01) |
| *H04W 52/02* | (2009.01) |

(52) U.S. Cl.
CPC ...... *H04L 27/2613* (2013.01); *H04L 27/2617* (2013.01); *H04L 27/2692* (2013.01); *H04W 56/00* (2013.01); *H04J 3/06* (2013.01); *H04L 27/3854* (2013.01); *H04L 2027/0026* (2013.01); *H04W 16/14* (2013.01); *H04W 36/0094* (2013.01); *H04W 52/02* (2013.01); *H04W 84/042* (2013.01); *Y02D 70/10* (2018.01); *Y02D 70/12* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/26* (2018.01)

(56) References Cited

U.S. PATENT DOCUMENTS

2017/0251455 A1* 8/2017 Shin .................. H04W 56/0015
2017/0265156 A1* 9/2017 Xue .................... H04W 56/001
2018/0035416 A1* 2/2018 Yi ......................... H04L 5/0037
2018/0255524 A1* 9/2018 Wu ....................... H04W 56/00

OTHER PUBLICATIONS

3GPP TSG-RAN WG2 Meeting #95, 36.331, "Change Request", CR 2263, 13.2.0, R2-164888, Gothenburg, Sweden, Aug. 22-26, 2016, pp. 1-15.

CATT: "Remaining Issues on NB-MIB", 3GPP Draft; R1-161956, 3rd Generation Partnership Project (3GPP), Mobile Competence Centre, 650, Route Des Lucioles, F-06921, Sophia-Antipolis Cedex, France, Mar. 16, 2016, XP051081072, Retrieved from the Internet: URL:http://www .3gpp.org/ftp/tsg_ran/WG1_RL1/TSGR1_AH/LTE_NB-IoT_1603/Docs/ [retrieved on Mar. 16, 2016], 4 pages.

Huawei et al., "Analysis of Channel Raster Impact on NB-IoT", 3GPP Draft; R1-156924, 3rd Generation Partnership Project (3GPP), Mobile Competence Centre, 650, Route Des Lucioles, F-06921, Sophia-Antipolis Cedex, France, vol. RAN WG1, No. Anaheim, USA; Nov. 7, 2015, XP051042113, Retrieved from the Internet: URL:http://www.3gpp.org/ftp/tsg_ran/WG1_RL1/TSGR1_83/Docs/ [retrieved on Nov. 7, 20157], 5 pages.

International Search Report and Written Opinion—PCT/US2017/044754—ISA/EPO—dated Nov. 28, 2017.

Nokia Networks: "On the Channel Raster Design for NB-IoT", 3GPP Draft; R1-160172, 3rd Generation Partnership Project (3GPP), Mobile Competence Centre, 650, Route Des Lucioles, F-06921, Sophia-Antipolis Cedex, France, vol. RAN WG1, No. Budapest, HU; Jan. 12, 2016, XP051064776, Retrieved from the Internet: URL: http://www.3gpp.org/ftp/tsg_ran/WG1_RL1/TSGR1_AH/LTE_NB-IoT 1601/Docs/ [retrieved on Jan. 12, 2016], 7 pages.

* cited by examiner

SYSTEM AND METHOD THAT FACILITATES A COEXISTENCE OF FIFTH GENERATION NEW RADIO RESOURCE TECHNOLOGY WITH NARROWBAND INTERNET-OF-THINGS TECHNOLOGY

CROSS-REFERENCE TO RELATED APPLICATION(S)

This application claims priority to and the benefit of U.S. Provisional Patent Application No. 62/403,670, filed on Oct. 3, 2016, the entire content of which is incorporated herein by reference as if fully set forth below in its entirety and for all applicable purposes.

TECHNICAL FIELD

The technology discussed below relates generally to wireless communication systems, and more particularly, to embodiments that facilitate a coexistence of fifth generation (5G) new radio (NR) technology with narrow-band internet-of-things (NB-IOT) technology.

INTRODUCTION

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) new radio (NR) network as that term is defined by the next generation mobile networks (NGMN) alliance. As it stands today, this 5G NR network may exhibit a higher degree of flexibility and scalability than LTE, and is envisioned to support very diverse sets of requirements. Moreover, 5G NR is envisioned to facilitate communications between various types of devices, including narrow-band internet-of-things (NB-IOT) devices.

NB-IOT, also known as LTE Cat. NB1, is a Low Power Wide Area (LPWA) technology designed to connect devices more simply and efficiently on already established mobile networks, and to handle small amounts of fairly infrequent 2-way data, securely and reliably. In recent years, NB-IOT has significantly increased in popularity since it provides an inexpensive cellular air interface that supports a large number of NB-IOT applications that do not need all the capabilities of most other interfaces. In response to this popularity, it is thus anticipated that supporting NB-IOT applications on a 5G NR network will become particularly desirable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In the examples below, disclosed aspects relate to a coexistence of a first radio access technology (RAT), such as a fifth generation (5G) new radio (NR) technology with a second RAT, such as a narrow-band internet-of-things (NB-IOT) technology. As used herein, a RAT is defined as a type of technology or communication standard utilized for radio access and communication over a wireless air interface. Additional examples of RATs include Global System for Mobile (GSM), UTRA, E-UTRA (LTE), Bluetooth, and Wi-Fi.

In one example, a method of wireless communication is disclosed. The method includes defining a first RAT resource block size and a second RAT resource block size. The method further includes identifying a compatible alignment of a first RAT resource block and a second RAT resource block in which the compatible alignment aligns each of a first RAT synchronization signal and a corresponding second RAT synchronization signal within a threshold offset from a channel raster. The method also includes determining an offset associated with the compatible alignment of the first RAT resource block and the second RAT resource block. Within such example, the offset is within the threshold offset and facilitates an identification of a valid second RAT resource block.

In a second example, a wireless communication device is disclosed, which includes a processor communicatively coupled to a memory, a transceiver, a block size circuitry, an alignment circuitry, and an offset circuitry. For this example, the block size circuitry is configured to define a first RAT resource block size and a second RAT resource block size, whereas the alignment circuitry is configured to identify a compatible alignment of a first RAT resource block and a second RAT resource block such that the compatible alignment aligns each of a first RAT synchronization signal and a corresponding second RAT synchronization signal within a threshold offset from a channel raster. The offset circuitry is then configured to determine an offset associated with the compatible alignment of the first RAT resource block and the second RAT resource block in which the offset is within the threshold offset and facilitates an identification of a valid second RAT resource block.

In a third example, another method of wireless communication is disclosed. The method includes ascertaining an offset associated with a compatible alignment of a first RAT resource block and a second RAT resource block. Within such example, the compatible alignment aligns each of a first RAT synchronization signal and a corresponding second RAT synchronization signal within a threshold offset from a channel raster. The method further includes shifting the channel raster according to the offset associated with the compatible alignment.

In a fourth example, another wireless communication device is disclosed, which includes a processor communicatively coupled to a memory, a transceiver, and an alignment circuitry. For this example, the alignment circuitry is configured to ascertain an offset associated with a compatible alignment of a first RAT resource block and a second RAT resource block. Here, the compatible alignment aligns each of a first RAT synchronization signal and a corresponding second RAT synchronization signal within a threshold offset from a channel raster. The alignment circuitry is then further configured to shift the channel raster according to the offset associated with the compatible alignment.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Overview

As previously stated, in response to the increasing popularity of narrow-band internet-of-things (NB-IOT) devices, it is anticipated that supporting NB-IOT applications on any of various radio access technologies (e.g., a fifth generation (5G) new radio (NR) network) will become particularly desirable. Accordingly, aspects disclosed herein are directed towards facilitating a coexistence of a first radio access technology (e.g., 5G NR technology) with a second radio access technology (e.g., NB-IOT technology). For instance, particular embodiments are directed towards detecting NB-IOT synchronization signals within a 5G NR network. Similar to Long Term Evolution (LTE) networks, it is anticipated that such detection will require that NB-IOT synchronization signals be no more than 7.5 kHz from a channel raster. Here, a channel raster is defined as the steps or frequency increments used by a user equipment (UE) to detect a synchronization signal. Similar to existing LTE UEs, an NB-IoT UE is only required to search for a carrier on a 100 kHz raster (e.g., search at 100 kHz, then 200 kHz, then 300 kHz, etc.). However, as will be discussed in greater detail below, such raster constraint undesirably limits the number of resource blocks that are NB-IOT compatible. Embodiments disclosed herein overcome this limitation by strategically defining block sizes for a first radio access technology (e.g., 5G NR) so that a greater number of such resource blocks are compatible with a second radio access technology (e.g., NB-IOT).

Radio Access Network

Figure 1:
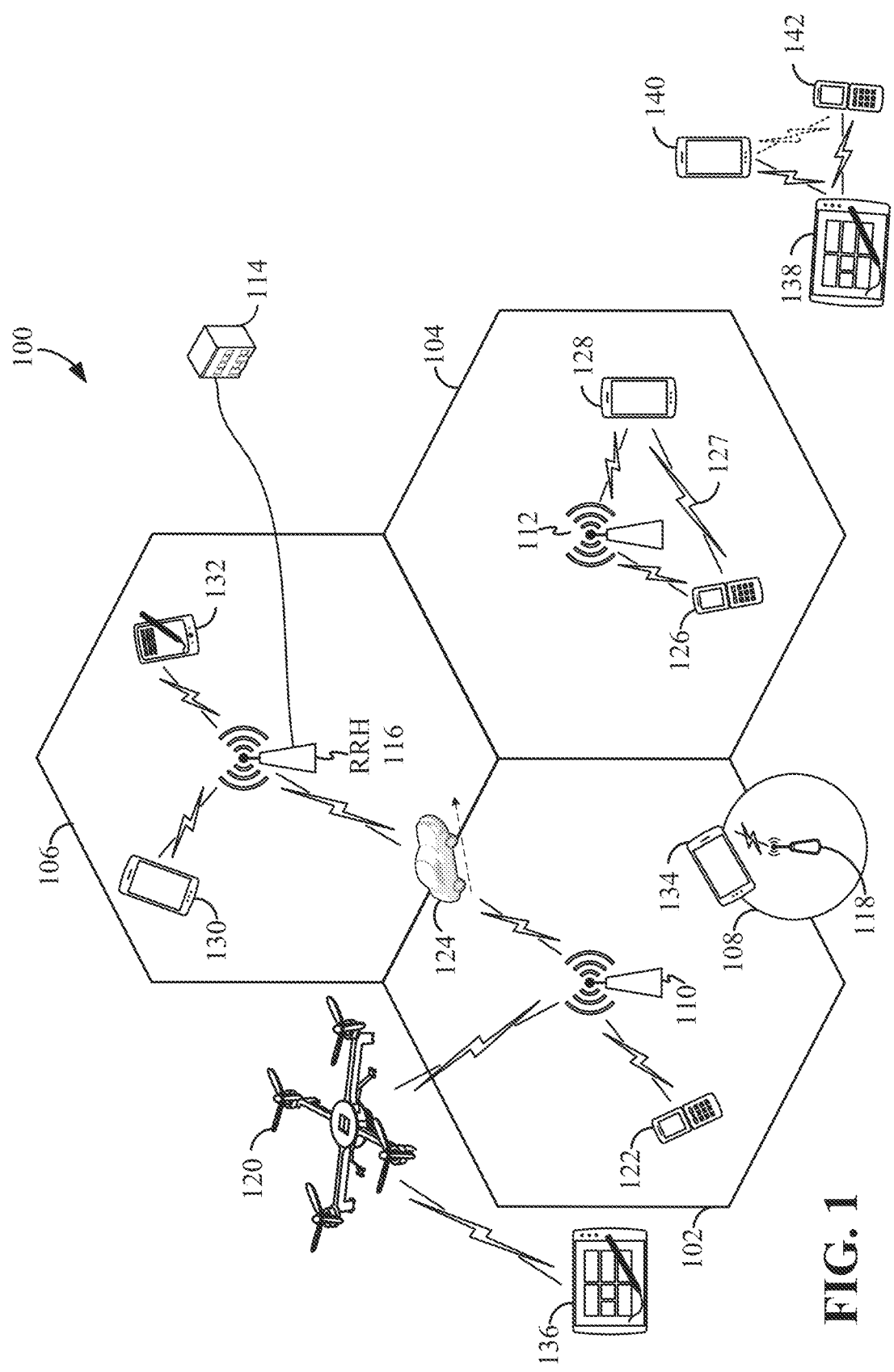
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (TDM), orthogonal frequency division multiplexing (OFDM), sparse code multiplexing (SCM), or other suitable multiplexing schemes.

In an example utilizing OFDM, an air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

In OFDM, to maintain orthogonality of the subcarriers or tones, the subcarrier spacing is equal to the inverse of the symbol period. A scalable numerology refers to the capability of the network to select different subcarrier or tone spacings, and accordingly, with each spacing, to select the corresponding symbol period. The symbol period should be short enough that the channel does not significantly vary over each period, in order to preserve orthogonality and limit inter-subcarrier interference.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
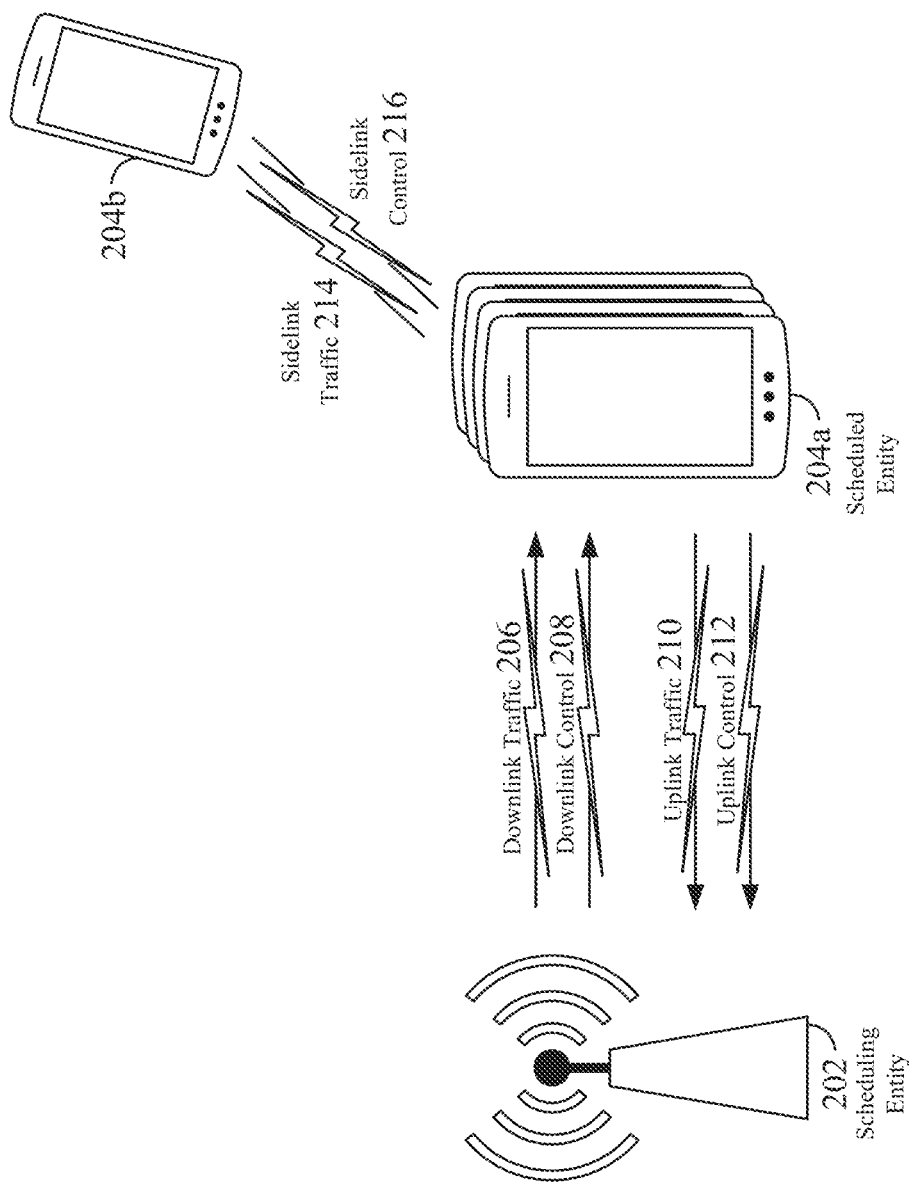
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Exemplary Scheduling Entity

Figure 3:
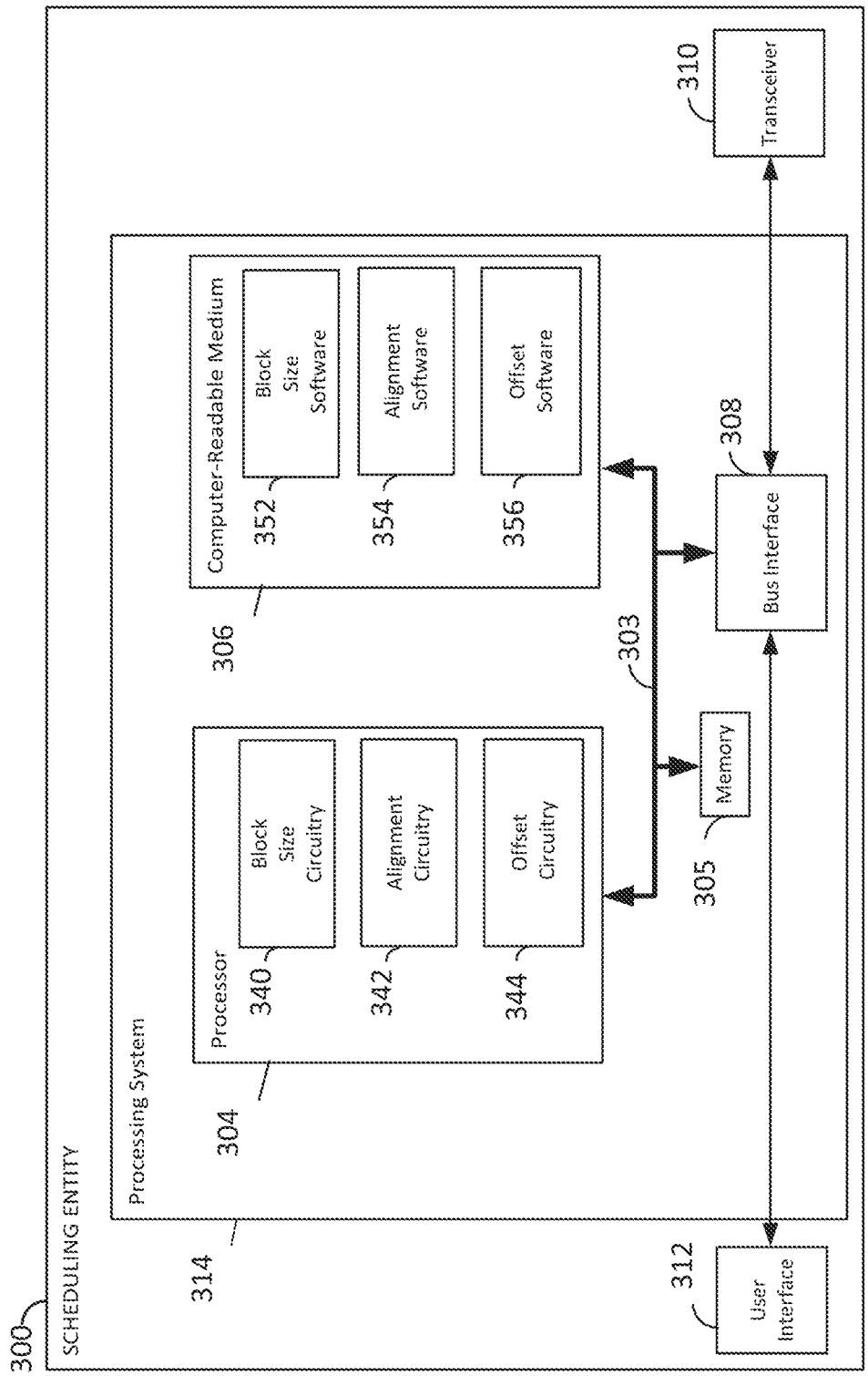
FIG. 3 is a block diagram illustrating an example of a hardware implementation for a scheduling entity that facilitates a coexistence of fifth generation (5G) new radio (NR) technology with narrow-band internet-of-things (NB-IOT) technology according to some aspects of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of the FIGS. disclosed herein. In another example, the scheduling entity 300 may be a base station as also illustrated in any one or more of the FIGS. disclosed herein.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIG. 4.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include block size circuitry 340 configured for various functions, including, for example, defining a fifth generation (5G) new radio (NR) resource block size and a narrow band internet-of-things (NB-IOT) resource block size. As used herein, a resource block is defined as a block or set of resource elements (REs) having X symbols in the time domain and Y tones in the frequency domain. In a particular example, resource block sizes are twelve tones, wherein individual tones associated with each of the 5G NR resource block size and the NB-IOT resource block size are 15 kHz. As illustrated, the processor 304 may also include alignment circuitry 342 configured for various functions. For instance, alignment circuitry 342 may be configured to identify a compatible alignment of an NB-IOT resource block and a 5G NR resource block, wherein the compatible alignment aligns each of an NB-IOT synchronization signal and a corresponding 5G NR synchronization signal within a threshold offset (e.g., +/−7.5 kHz) from a channel raster (e.g., a 100 kHz channel raster). The processor 304 may further include offset circuitry 344 configured for various functions, including, for example, determining an offset associated with the compatible alignment of the NB-IOT resource block and the 5G NR resource block, wherein the offset is within the threshold offset and facilitates an identification of a valid NB-IOT resource block. To this end, it should be appreciated that, the combination of the block size circuitry 340, the alignment circuitry 342, and the offset circuitry 344 may be configured to implement one or more of the functions described herein.

Various other aspects for scheduling entity 300 are also contemplated. For instance, examples are disclosed in which the 5G NR resource block size is greater than the NB-IOT resource block size. In a particular example, the 5G NR resource block size is sixteen tones, whereas the NB-IOT resource block size is twelve tones. Within such example, as discussed in more detail below with reference to FIGS. 13-19, the alignment circuitry 342 is configured to identify the compatible alignment by evaluating a plurality of candidate alignments. Once a compatible alignment is found, the scheduling entity 300 may then determine how to use the empty 5G NR tones (i.e., the tones of the 5G NR resource block that are unaligned with the NB-IOT resource block). For instance, the processor 304 may be configured to transmit an enhanced mobile broadband (eMBB) communication via the empty 5G NR tones. Alternatively, rather than using the empty 5G NR tones, the processor 304 may be configured to utilize at least a portion of the energy allocated for the empty 5G NR tones to transmit the NB-IOT tones.

In another aspect disclosed herein, the transmission of offset information is contemplated. For instance, the processor 304 may be further configured to transmit such offset information to a scheduled entity (e.g., a UE). Here, it should be appreciated that the offset information may include the actual offset, or information that facilitates a retrieval of the offset by the scheduled entity. For example, the processor 304 may be configured to include the offset information in a bit transmitted via a narrowband physical broadcasting channel (N-PBCH), wherein the bit facilitates an identification of a channel raster table corresponding to the offset. The scheduled entity may then retrieve the offset from the channel raster table identified by the bit.

Referring back to the remaining components of scheduling entity 300, it should be appreciated that the processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include block size software 352 configured for various functions, including, for example, defining a 5G NR resource block size and an NB-IOT resource block size. In a particular example, resource block sizes are twelve tones, wherein individual tones associated with each of the 5G NR resource block size and the NB-IOT resource block size are 15 kHz. As illustrated, the computer-readable storage medium 306 may also include alignment software 354 configured for various functions. For instance, the alignment software 354 may be configured to identify a compatible alignment of an NB-IOT resource block and a 5G NR resource block, wherein the compatible alignment aligns each of an NB-IOT synchronization signal and a corresponding 5G NR synchronization signal within a threshold offset (e.g., +/−7.5 kHz) from a channel raster (e.g., a 100 kHz channel raster). The computer-readable storage medium 306 may further include offset software 356 configured for various functions, including, for example, determining an offset associated with the compatible alignment of the NB-IOT resource block and the 5G NR resource block, wherein the offset is within the threshold offset and facilitates an identification of a valid NB-IOT resource block.

It should be appreciated that the combination of the block size software 352, the alignment software 354, and the offset software 356 may be configured to implement one or more of the functions described herein. For instance, as previously stated, aspects are disclosed in which the 5G NR resource block size is greater than an NB-IOT resource block size. In a particular example, the 5G NR resource block size is sixteen tones, whereas the NB-IOT resource block size is twelve tones, wherein the alignment software 354 is configured to identify the compatible alignment by evaluating a plurality of candidate alignments. With respect to the empty 5G NR tones, the scheduling entity 300 may again utilize such tones to transmit an eMBB communication, or utilize a portion of the energy allocated for the empty tones to transmit the NB-IOT tones.

As previously stated, the transmission of offset information is also contemplated. For instance, the computer-readable storage medium 306 may be further configured to transmit such offset information to a scheduled entity (e.g., a UE), wherein the offset information may include the actual offset, or information that facilitates a retrieval of the offset by the scheduled entity. For example, the computer-readable storage medium 306 may be configured to include the offset information in a bit transmitted via an N-PBCH, wherein the bit facilitates an identification of a channel raster table corresponding to the offset. The scheduled entity may then retrieve the offset from the channel raster table identified by the bit.

In one configuration, the scheduling entity 300 includes means for defining resource block sizes, means for identifying a compatible alignment, and means for determining an offset associated with the compatible alignment. In one aspect, the aforementioned means may be the processor(s) 304 configured to perform the functions recited by the aforementioned means. In another aspect, the aforementioned means may be a circuit or any apparatus configured to perform the functions recited by the aforementioned means.

Figure 4:
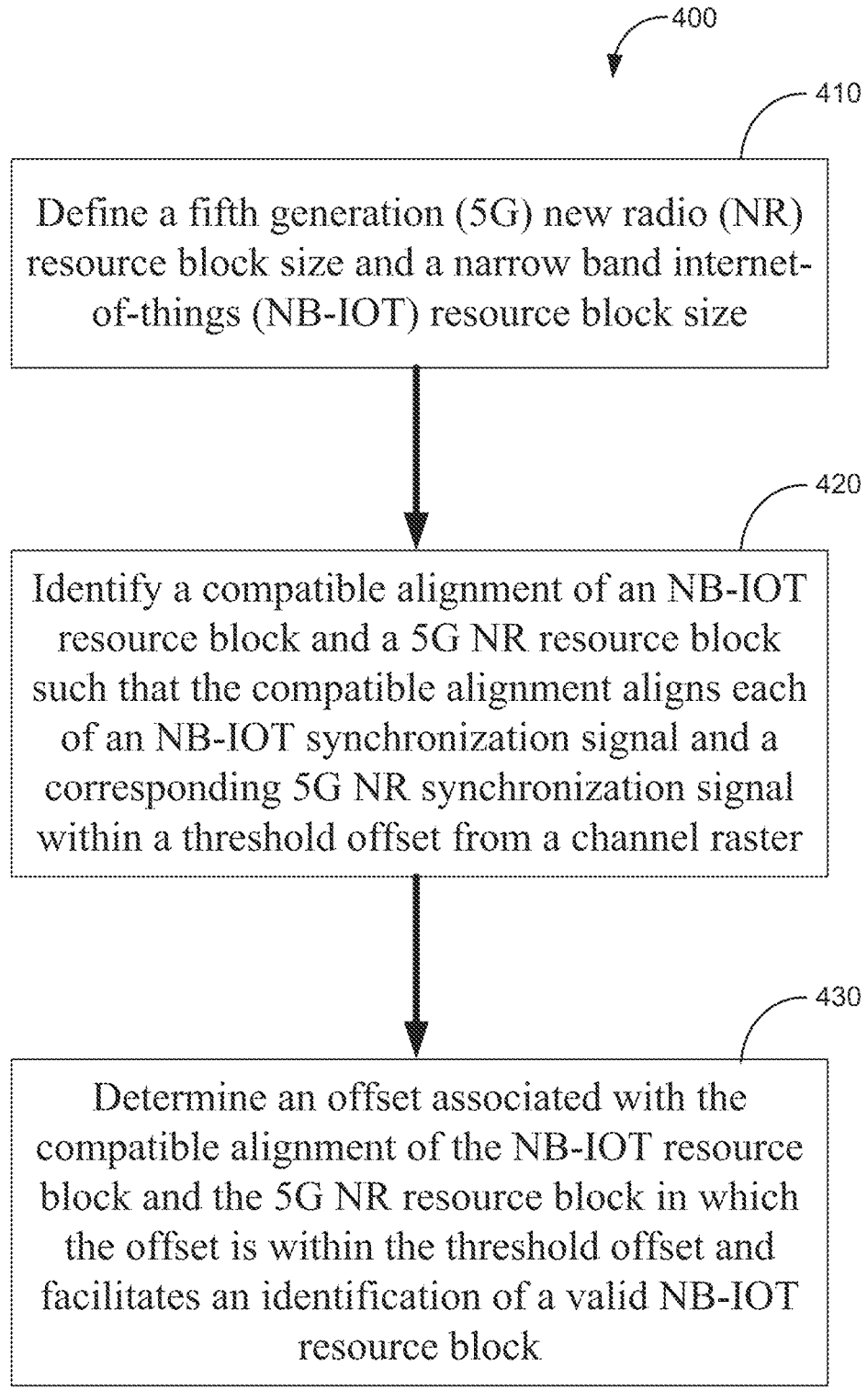
FIG. 4 is a flow chart illustrating an exemplary scheduling entity process that facilitates a coexistence of 5G NR technology with NB-IOT technology according to some aspects of the disclosure.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described herein and utilizing, for example, the processes and/or algorithms described in relation to FIG. 4.

In FIG. 4, a flow chart is provided, which illustrates an exemplary scheduling entity process that facilitates a coexistence of 5G NR technology with NB-IOT technology according to some aspects of the disclosure. As described below, some or all illustrated features may be omitted in a particular implementation within the scope of the present disclosure, and some illustrated features may not be required for implementation of all embodiments. In some examples, the process 400 may be carried out by the scheduling entity 300 illustrated in FIG. 3. In some examples, the process 400 may be carried out by any suitable apparatus or means for carrying out the functions or algorithm described below.

Process 400 begins at block 410 with the defining of a 5G NR resource block size and an NB-IOT resource block size. Here, although embodiments are contemplated in which the 5G NR resource block size and the NB-IOT resource block size are equal, embodiments are also contemplated in which the 5G NR resource block size is greater than the NB-IOT resource block size. For instance, as previously stated, particular embodiments are contemplated in which the 5G NR resource block size is sixteen tones, and the NB-IOT resource block size is twelve tones.

Once the resource block sizes are defined, process 400 proceeds to block 420 where a compatible alignment of an NB-IOT resource block and a 5G NR resource block is identified. For this embodiment, the compatible alignment aligns each of an NB-IOT synchronization signal and a corresponding 5G NR synchronization signal within a threshold offset (e.g., +/−7.5 kHz) from a channel raster (e.g., 100 kHz). At block 430, process 400 then concludes with the determination of an offset associated with the compatible alignment of the NB-IOT resource block and the 5G NR resource block in which the offset is within the threshold offset and facilitates an identification of a valid NB-IOT resource block.

Exemplary Scheduled Entity

Figure 5:
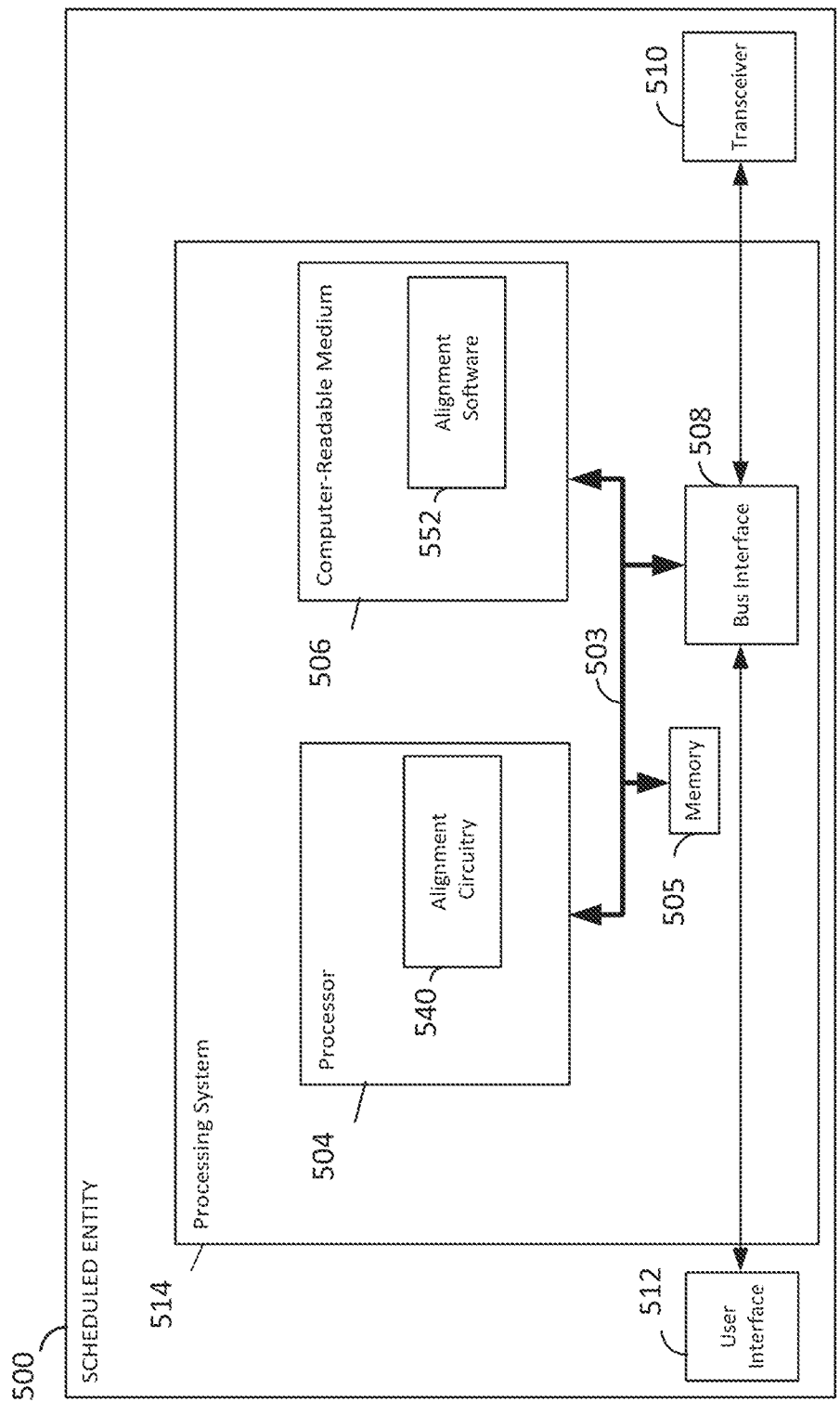
FIG. 5 is a block diagram illustrating an example of a hardware implementation for a scheduled entity that facilitates a coexistence of 5G NR technology with NB-IOT technology according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1 and/or 2.

The processing system 514 may be substantially the same as the processing system 314 illustrated in FIG. 3, including a bus interface 508, a bus 502, memory 505, a processor 504, and a computer-readable medium 506. Furthermore, the scheduled entity 500 may include a user interface 512 and a transceiver 510 substantially similar to those described above in FIG. 3. That is, the processor 504, as utilized in a scheduled entity 500, may be used to implement any one or more of the processes described below and illustrated in the various figures.

In some aspects of the disclosure, the processor 504 may include alignment circuitry 540 configured for various functions, including, for example, ascertaining an offset associated with a compatible alignment of a fifth generation (5G) new radio (NR) resource block and a narrow band internet-of-things (NB-IOT) resource block. Here, the compatible alignment aligns each of an NB-IOT synchronization signal and a corresponding 5G NR synchronization signal within a threshold offset (e.g., +/−7.5 kHz) from a channel raster (e.g., 100 kHz). The alignment circuitry 540 is then further configured to shift the channel raster according to the offset associated with the compatible alignment.

Various other aspects for scheduled entity 500 are also contemplated. For instance, examples are disclosed in which the 5G NR resource block size is greater than the NB-IOT resource block size. In a particular example, the 5G NR resource block size is sixteen tones, whereas the NB-IOT resource block size is twelve tones. It should be appreciated that whenever the 5G NR resource block size is greater than the NB-IOT resource block size, the empty 5G NR tones (i.e., tones of the 5G NR resource block that are unaligned with the NB-IOT resource block) may be used in any of various ways. For instance, the processor 504 may be configured to receive an enhanced mobile broadband (eMBB) communication via the empty 5G NR tones.

In another aspect of the disclosure, it is contemplated that the alignment circuitry 540 may be configured to ascertain the offset based on a received communication. Here, it should be appreciated that the offset may be included in the received communication, or the received communication may include information to facilitate retrieving the offset. For instance, the alignment circuitry 540 may be configured to ascertain the offset based on a communication received via a narrowband physical broadcasting channel (N-PBCH). Within such example, the alignment circuitry 540 may be further configured to retrieve the offset from a channel raster table identified by a bit included in the communication received via the N-PBCH.

Similar to processor 304, processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. Similar to computer-readable medium 306, computer-readable medium 506 may be a non-transitory computer-readable medium comprising characteristics that are substantially similar. The computer-readable medium 506 may reside in the processing system 514, external to the processing system 514, or distributed across multiple entities including the processing system 514. It should also be appreciated that, similar to computer-readable medium 306, computer-readable medium 506 may be embodied in a computer program product comprising characteristics that are substantially similar.

In one or more examples, the computer-readable storage medium 506 may include alignment software 552 configured for various functions, including, for example, ascertaining an offset associated with a compatible alignment of a 5G NR resource block and an NB-IOT resource block. Here, the compatible alignment aligns each of an NB-IOT synchronization signal and a corresponding 5G NR synchronization signal within a threshold offset (e.g., +/−7.5 kHz) from a channel raster (e.g., 100 kHz). The alignment software 552 is then further configured to shift the channel raster according to the offset associated with the compatible alignment.

It should also be appreciated that the alignment software 552 may be configured to implement various other functions described herein. For instance, as previously stated, aspects are disclosed in which the 5G NR resource block size is greater than the NB-IOT resource block size (e.g., where the 5G NR resource block size is sixteen tones, and the NB-IOT resource block size is twelve tones). Also, as previously stated, the empty 5G NR tones may be used in any of various ways including, for example, where the computer-readable storage medium 506 is configured to receive an eMBB communication via the empty 5G NR tones.

In another aspect of the disclosure, it is contemplated that the alignment software 552 may be configured to ascertain the offset based on a received communication, wherein the offset may be included in the received communication, or the received communication may include information to facilitate retrieving the offset. For instance, the alignment software 552 may be configured to ascertain the offset based on a communication received via an N-PBCH, wherein the alignment software 552 may be further configured to retrieve the offset from a channel raster table identified by a bit included in the N-PBCH communication.

In one configuration, the scheduled entity 500 includes means for ascertaining an offset associated with a compatible alignment, and means for shifting a channel raster according to the offset. In one aspect, the aforementioned means may be the processor(s) 504 configured to perform the functions recited by the aforementioned means. In another aspect, the aforementioned means may be a circuit or any apparatus configured to perform the functions recited by the aforementioned means.

Figure 6:
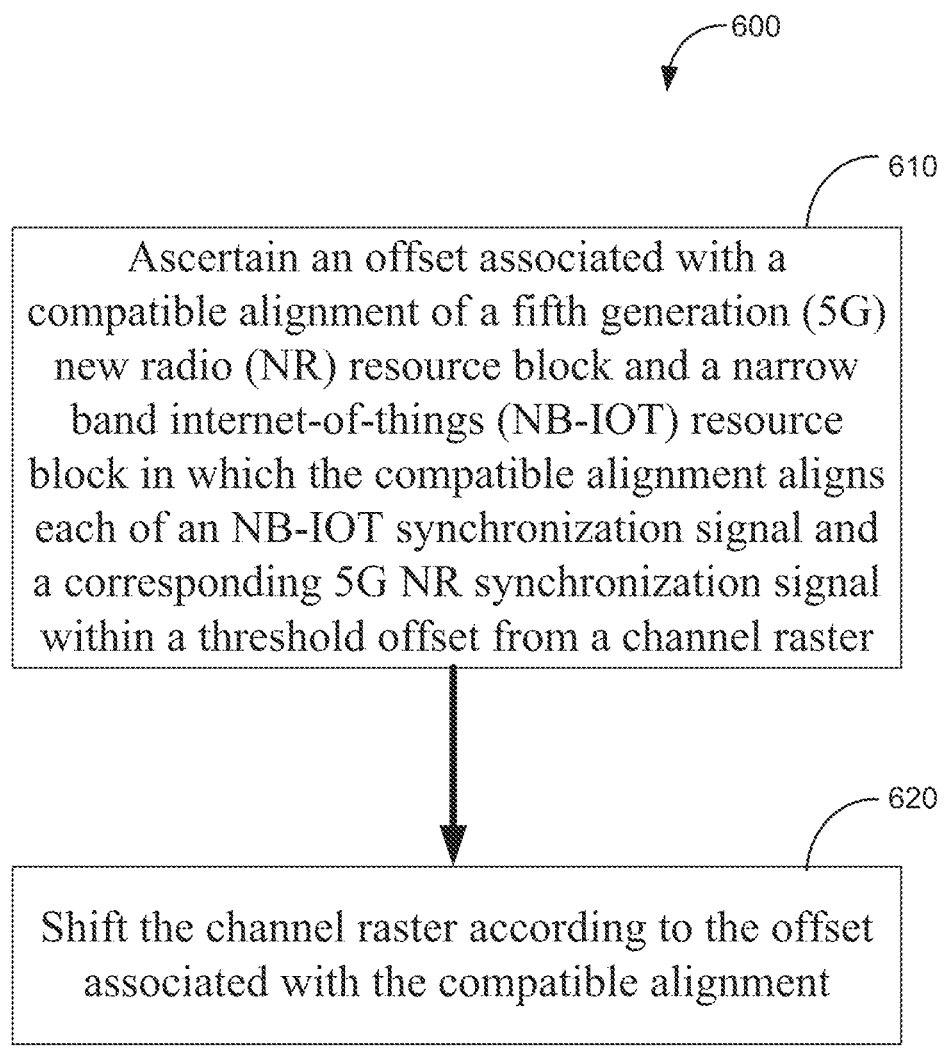
FIG. 6 is a flow chart illustrating an exemplary scheduling entity process that facilitates a coexistence of 5G NR technology with NB-IOT technology according to some aspects of the disclosure.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described herein, and utilizing, for example, the processes and/or algorithms described in relation to FIG. 6.

In FIG. 6, a flow chart is provided, which illustrates an exemplary scheduled entity process that facilitates a coexistence of 5G NR technology with NB-IOT technology according to some aspects of the disclosure. As described below, some or all illustrated features may be omitted in a particular implementation within the scope of the present disclosure, and some illustrated features may not be required for implementation of all embodiments. In some examples, the process 600 may be carried out by the scheduled entity 500 illustrated in FIG. 5. In some examples, the process 600 may be carried out by any suitable apparatus or means for carrying out the functions or algorithm described below.

Process 600 begins at block 610 with the ascertaining of an offset associated with a compatible alignment of a 5G NR resource block and an NB-IOT resource block. As previously stated, such compatible alignment corresponds to an alignment of each of an NB-IOT synchronization signal and a corresponding 5G NR synchronization signal within a threshold offset (e.g., +/−7.5 kHz) from a channel raster (e.g., 100 kHz). At block 620, process 600 then concludes with a shifting of the channel raster according to the offset associated with the compatible alignment.

Exemplary Implementations

Various embodiments disclosed herein are directed towards facilitating the detection of narrow band internet-of-things (NB-IOT) synchronization signals within a fifth generation (5G) new radio (NR) network. As previously stated, it is anticipated that such detection will require that NB-IOT synchronization signals be no more than 7.5 kHz from a channel raster, wherein a channel raster is defined as the steps or frequency increments used by a user equipment (UE) to detect a synchronization signal. For instance, if a 100 kHz raster is assumed, a UE may first search at 100 kHz, wherein a synchronization signal within 7.5 kHz of 100 kHz is detected (i.e., between 92.5 kHz and 107.5 kHz). If a synchronization signal is not found at 100 kHz, the UE may then search at 200 kHz (+/−7.5 kHz), then 300 kHz (+/−7.5 kHz), etc., until a synchronization signal is found. However, as will be discussed in greater detail below, the constraint of having to transmit synchronization signals within 7.5 kHz of a channel raster, undesirably limits the number of resource blocks that are NB-IOT compatible. Embodiments disclosed herein overcome this limitation by strategically defining block sizes for 5G NR so that a greater number of such resource blocks are compatible with NB-IOT.

Figure 7:
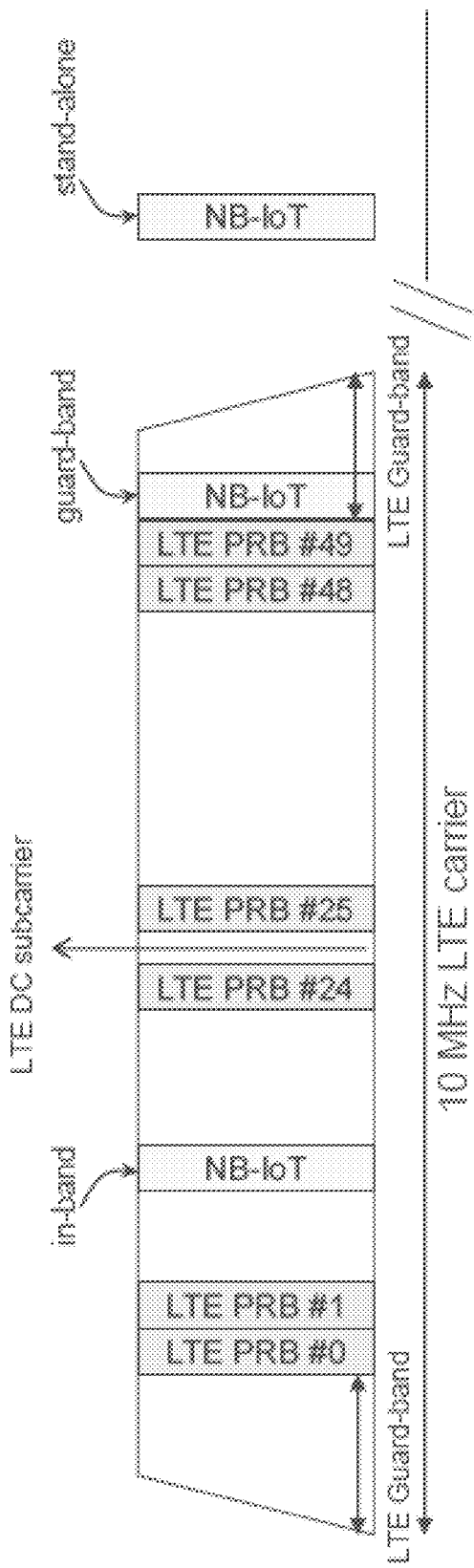
FIG. 7 is a schematic diagram illustrating exemplary NB-IOT deployments according to some aspects of the disclosure.

Although the aspects disclosed herein may apply to channel rasters of various sizes, examples of particular implementations are provided, which assume a 100 kHz channel raster for Long Term Evolution (LTE), 5G NR, and NB-IOT. For these exemplary implementations, the center of the synchronization signal (NB-PSS/NB-SSS) is aligned with the 100 kHz channel raster, wherein the synchronization signals are no more than 7.5 kHz from the channel raster. As is generally known in the art, an NB-IoT carrier may be deployed as a stand-alone carrier using any available spectrum exceeding 180 kHz. It may also be deployed within an LTE spectrum allocation, either inside an LTE carrier or in the guard band. (See e.g., FIG. 7). As used herein, the term in-band NB-IOT will refer to an NB-IOT carrier within either an LTE or 5G NR spectrum allocation.

Figure 8:
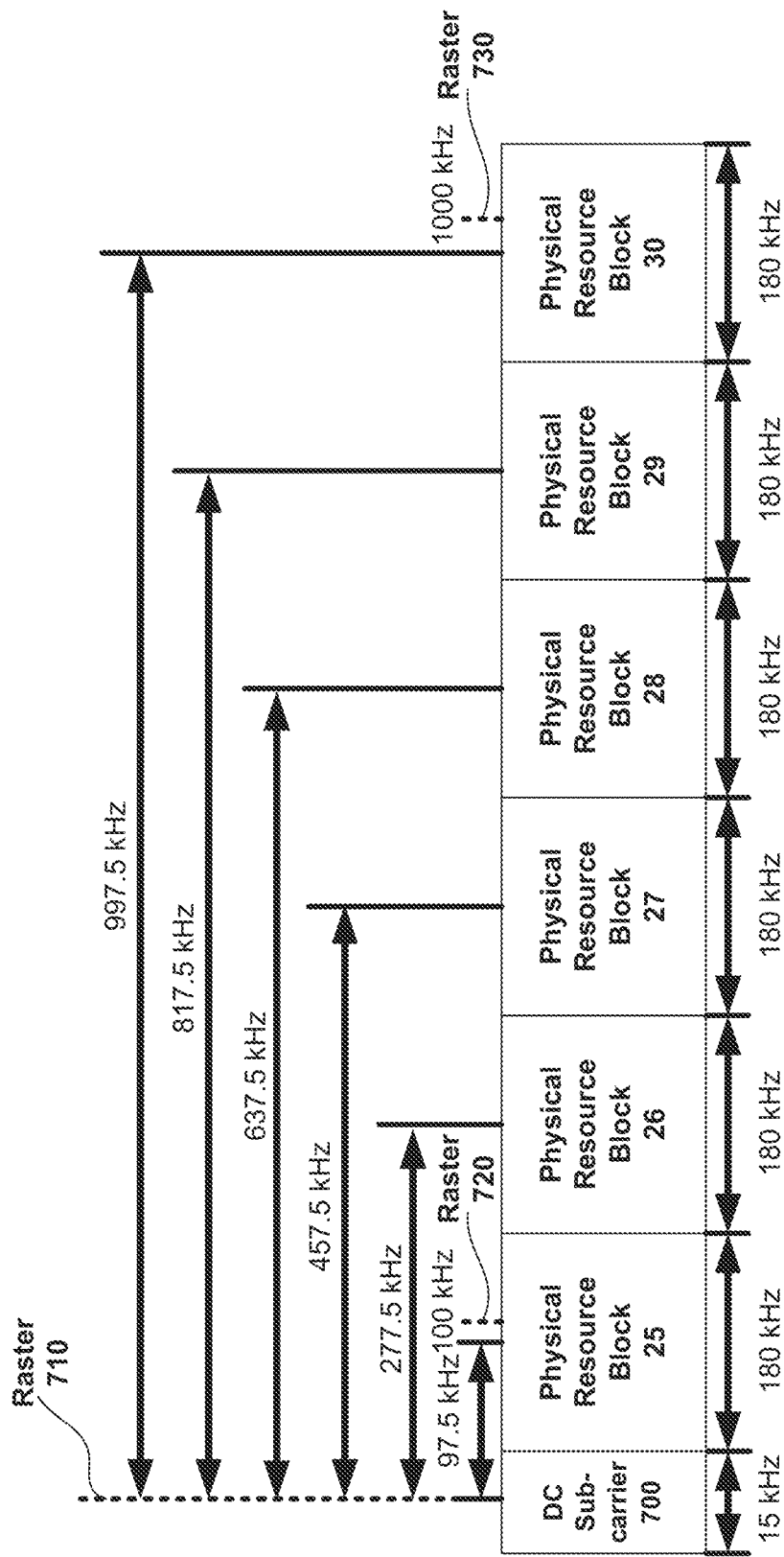
FIG. 8 is a block diagram illustrating exemplary spacing between resource blocks.

For LTE in-band NB-IOT, it should be noted that only one of every five LTE resource blocks can be used for NB-IOT due to the 100 kHz channel raster constraints. To better demonstrate this constraint, reference is made to the 10 MHz LTE spectrum provided in FIG. 8. As illustrated, a 15 kHz direct current (DC) subcarrier 700 is centered on a first 100 kHz channel raster 710, wherein physical resource block 25 is centered 97.5 kHz away from the center of the DC subcarrier 700, as shown. The center of physical resource block 25 is thus 2.5 kHz from the nearest 100 kHz channel raster 720. Here, although physical resource block 25 is within 7.5 kHz of raster 720, it should be noted that the middle six physical resource blocks of an LTE spectrum allocation are used for synchronization and broadcast channels. Physical resource block 25 thus cannot be used for NB-IOT. However, because the spacing between the centers of two neighboring physical resource blocks is 180 kHz, the next physical resource block centered within 7.5 kHz of a 100 kHz channel raster is physical resource block 30, which is centered 2.5 kHz from raster 730, as shown.

Figure 9:
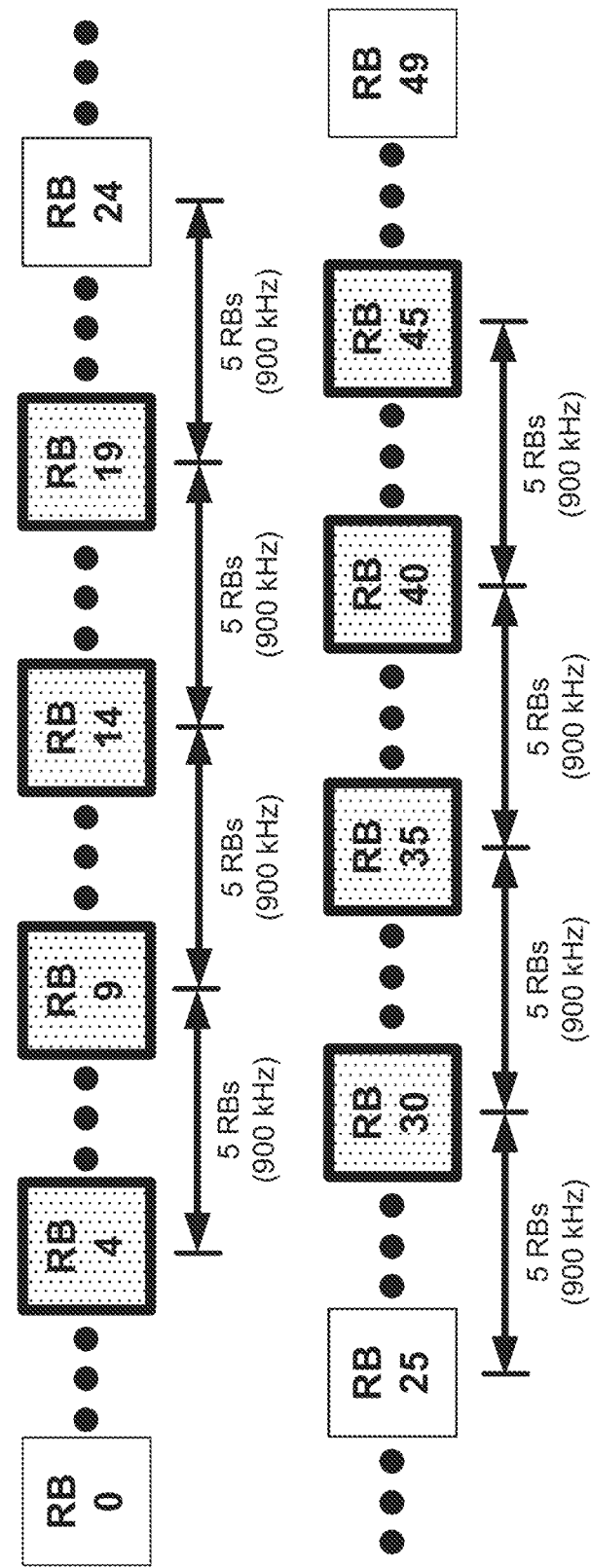
FIG. 9 is a block diagram identifying candidate resource blocks for transmitting an NB-IOT synchronization signal within a 10 MHz Long Term Evolution (LTE) spectrum in accordance with an embodiment.
Figure 10:
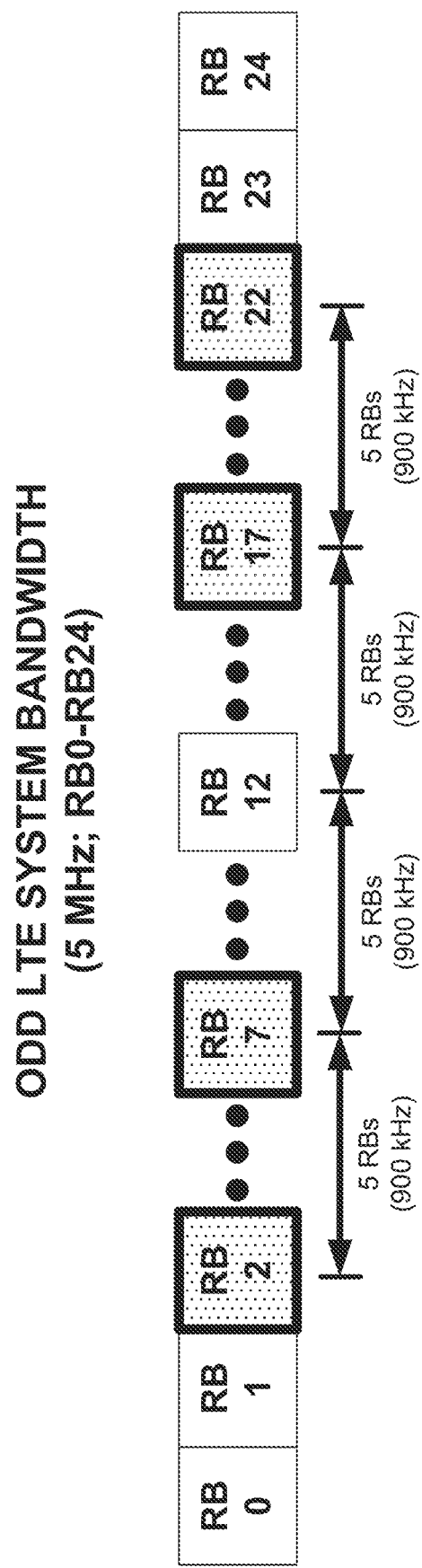
FIG. 10 is a block diagram identifying candidate resource blocks for transmitting an NB-IOT synchronization signal within a 5 MHz LTE spectrum in accordance with an embodiment.

Accordingly, a set of candidate physical resource blocks for NB-IOT may be contemplated for each of various LTE bandwidths, as indicated in Table T-1 below. FIGS. 9 and 10 illustrate how the distribution of these candidate resource blocks varies according to whether the bandwidth is odd or even, wherein FIG. 9 illustrates candidate resource blocks within a 10 MHz LTE spectrum, and FIG. 10 illustrates candidate resource blocks within a 5 MHz LTE spectrum.

TABLE T-1

| | LTE System Bandwidth | | | | |
|---|---|---|---|---|---|
| | 3 MHz | 5 MHz | 10 MHz | 15 MHz | 20 MHz |
| PRB Indices for NB-PSS/SSS Transmission | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

To better illustrate the complexity of supporting NB-IOT technology within a 5G NR network, an analysis of such coexistence is provided below in which two 5G NR resource block sizes (N_RE=12 tones & N_RE=16 tones) are considered. In both examples, however, it should be noted that no explicit DC tone is reserved, and that each resource block is exactly N_RE tones.

Figure 11:
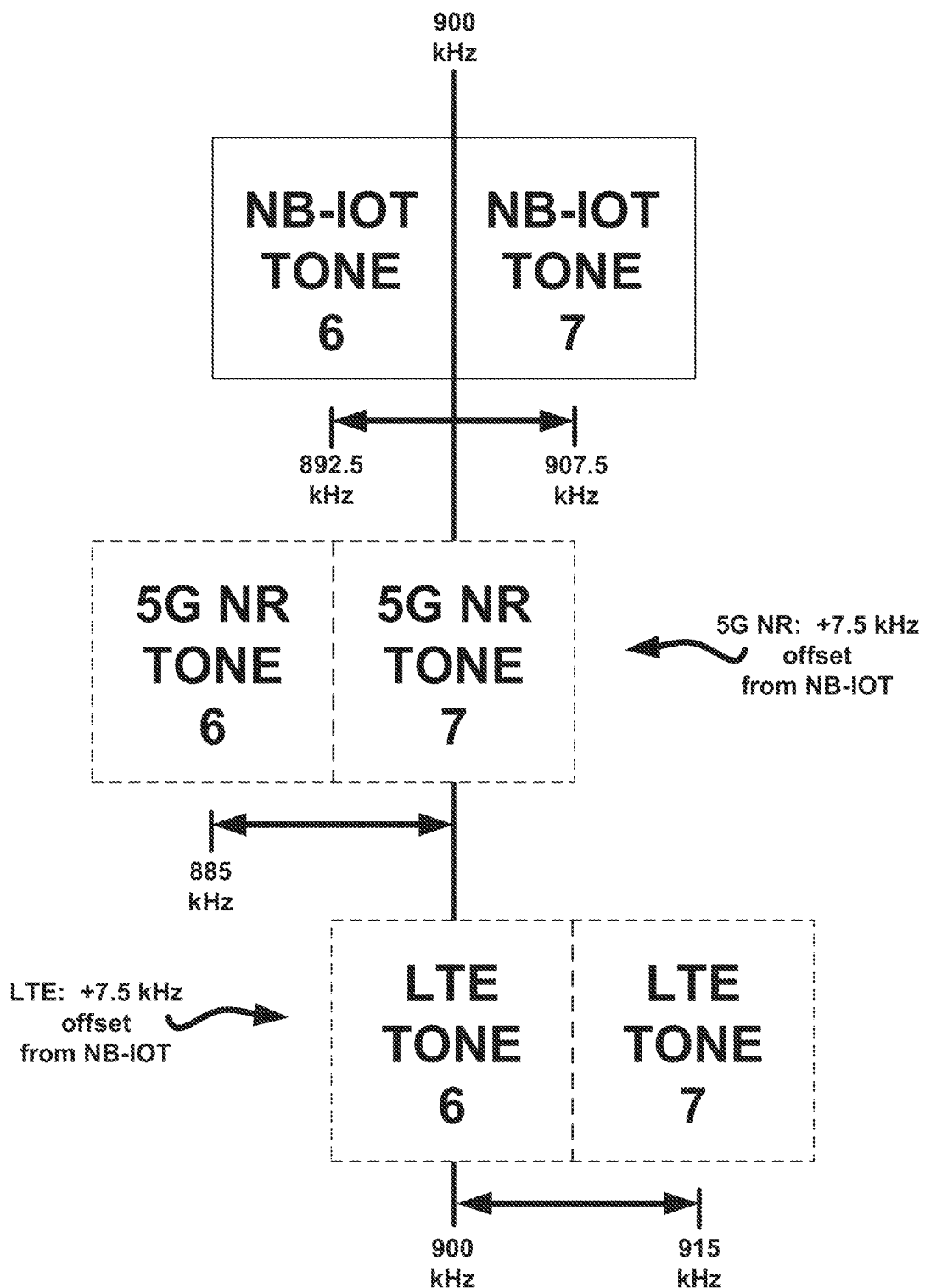
FIG. 11 is a block diagram illustrating an exemplary alignment of an NB-IOT synchronization signal with each of a 5G NR synchronization signal and an LTE synchronization signal within an LTE spectrum having an odd bandwidth.

When N_RE=12 tones, a valid RB for NB-IOT and LTE may not be a valid resource block for in-band 5G NR, if the same center carrier is assumed, which could be problematic. For instance, with respect to an odd LTE bandwidth (e.g., 3 MHz, 5 MHz, or 15 MHz), the same resource block cannot be compatible for both NB-IOT and 5G NR. Nevertheless, as illustrated in FIG. 11 and summarized in Table T-2 below, a network may provide a user equipment (UE) with an offset from NB-IOT for particular tones, which the UE may then use for proper channel raster alignment.

TABLE T-2

| Communication Type | Compatible Tone/Frequency | Compatible Tone/Frequency | Frequency Offset from NB-IOT |
|---|---|---|---|
| LTE | Tone 6 Frequency = 900 kHz (i.e., 180 kHz * 5) | Tone 7 Frequency = 915 kHz (i.e., 900 kHz + 15 kHz) | +7.5 kHz |
| NB-IOT | Tone 6 Frequency = 892.5 kHz (i.e., 900 kHz − 7.5 kHz) | Tone 7 Frequency = 907.5 kHz (i.e., 900 kHz + 7.5 kHz) | N/A |
| 5G NR | Tone 6 Frequency = 885 kHz (i.e., 180 kHz * 5 − 15 kHz) | Tone 7 Frequency = 900 kHz | −7.5 kHz |

Figure 12:
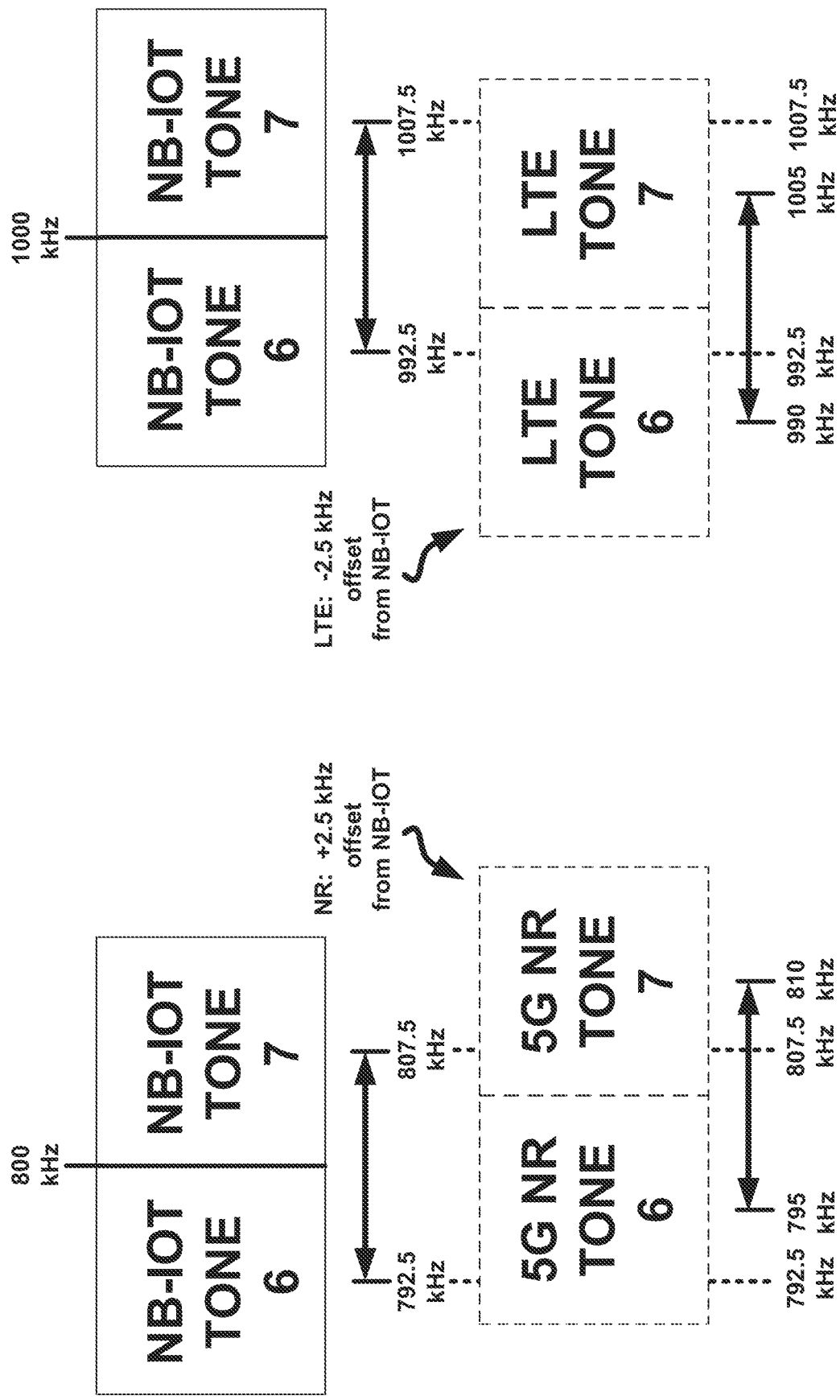
FIG. 12 is a block diagram illustrating an exemplary alignment of NB-IOT synchronization signals with each of a 5G NR synchronization signal and an LTE synchronization signal within an LTE spectrum having an even bandwidth.

With respect to an even LTE bandwidth (e.g., 10 MHz or 20 MHz), a network may also provide a UE with a channel raster offset, as illustrated in FIG. 12 and summarized in Table T-3 below. For an even LTE bandwidth, it should also be noted that half of the bandwidth could have the same resource block for both 5G NR and LTE.

TABLE T-3

| Communication Type | Compatible Tone/Frequency | Compatible Tone/Frequency | Frequency Offset from NB-IOT |
|---|---|---|---|
| LTE | Tone 6 Frequency = 990 kHz (i.e., 180 kHz * 5 + 90 kHz) | Tone 7 Frequency = 1005 kHz (i.e., 990 kHz + 15 kHz) | −2.5 kHz |
| NB-IOT | Tone 6 Frequency = 992.5 kHz (i.e., 1000 kHz − 7.5 kHz) | Tone 7 Frequency = 1007.5 kHz (i.e., 1000 kHz + 7.5 kHz) | N/A |
| 5G NR | Tone 6 Frequency = 885 kHz (i.e., 180 kHz * 5 − 15 kHz) | Tone 7 Frequency = 900 kHz | NOT COMPATIBLE WITH NB-IOT |
| NB-IOT | Tone 6 Frequency = 792.5 kHz (i.e., 800 kHz − 7.5 kHz) | Tone 7 Frequency = 807.5 kHz (i.e., 800 kHz + 7.5 kHz) | N/A |
| 5G NR | Tone 6 Frequency = 795 kHz (i.e., 180 kHz * 4 + 75 kHz) | Tone 7 Frequency = 810 kHz | +2.5 kHz |

Various other aspects should also be noted for when N_RE=12 tones. For instance, NB-IOT channel allocation inband 5G NR for 12 REs per resource block is not very flexible. Also, although NB-IOT does not have to be aware of the NR resource block index any more, the frequency offset may be indicated to NB-IOT via a narrowband physical broadcasting channel (N-PBCH). For example, in some NR deployments, a single bit can be used to point the UE to a new raster table, which may explicitly indicate the offset.

Figure 13:
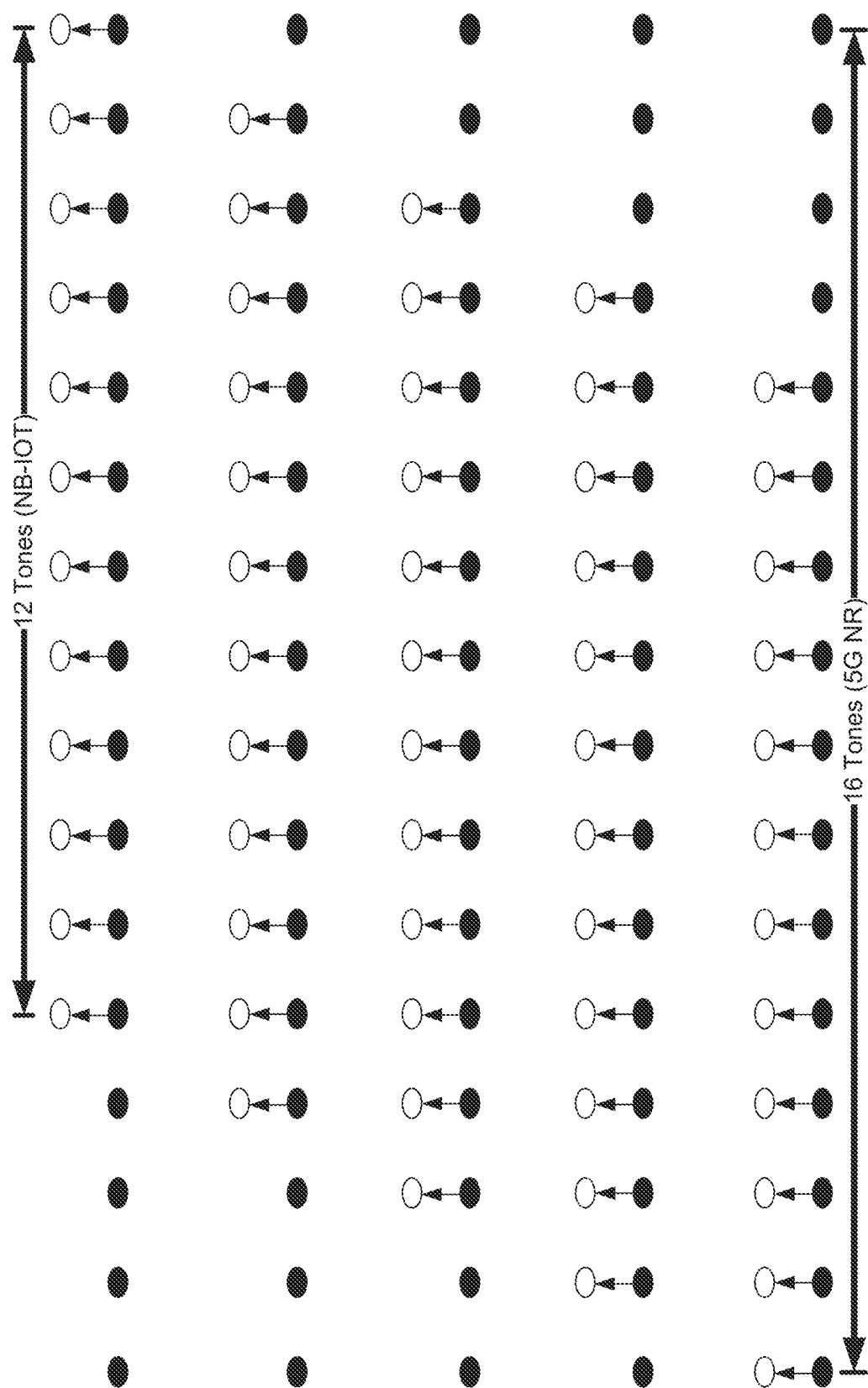
FIG. 13 is a schematic diagram illustrating exemplary alignments of an NB-IOT resource block with a 5G NR resource block in accordance with an embodiment.

When the size of the 5G NR resource block is greater than the NB-IOT resource block, a more flexible allocation of NB-IOT channels is achieved. FIG. 13, for instance, provides a particular example in which the 5G NR resource block is sixteen tones and the NB-IOT resource block is twelve tones. For this particular example, there are five ways the NB-IOT resource block can be channelized within the 5G NR resource block, which desirably provides a UE with more opportunities to align the channel raster.

Other benefits from having empty 5G NR tones are also contemplated. For instance, power saved from the four empty 5G NR tones may be used to boost power in the twelve NB-IOT tones, which may improve the signal-to-noise ratio. Alternatively, the empty tones can be re-used for enhanced mobile broadband (eMBB) communications or other UEs. Indeed, partial-RB usage may be defined for control channel transmissions or small-data applications in general (such as 4RE REG). Also, with respect to these benefits, it should be noted that an 5G NR numerology of 15 kHz is assumed. For numerologies other than 15 kHz, however, channelization with multiple NB-IOT channels is also contemplated.

Similar to the example provided above for twelve-tone 5G NR resource blocks, the same resource block cannot be compatible for both NB-IOT and NR for odd LTE bandwidths (e.g., 3 MHz, 5 MHz, or 15 MHz). Here, however, a network may again provide a UE with an offset from NB-IOT for particular tones, which the UE may then use for proper channel raster alignment. (See e.g., Table T-2 above).

Also similar to the twelve-tone NR resource block example, half of an even LTE bandwidth (e.g., 10 MHz or 20 MHz) could have the same resource block for both 5G NR and LTE. For an even LTE bandwidth, a network may again provide a UE with a channel raster offset, as summarized in Table T-4 below. For this particular example, a 1200 kHz cycling is assumed (i.e., 5*240 kHz), wherein the channel raster alignment is based on NB-IOT tone 6 at 92.5 kHz (i.e., 100 kHz-7.5 kHz) and NB-IOT tone 7 at 107.5 kHz (i.e., 100 kHz+7.5 kHz). As illustrated, four of the first five 5G NR resource blocks are compatible with NB-IOT.

TABLE T-4

| 5G NR Resource Block | Compatible Tone/Frequency | Frequency Offset from NB-IOT |
| --- | --- | --- |
| RB0 | Tone 6 Frequency = 90 kHz (i.e., 15 kHz * 0 + 90 kHz) | −2.5 kHz |
| RB1 | Tone 6 Frequency = 390 kHz (i.e., 15 kHz * 4 + 330 kHz) | −2.5 kHz |
| RB2 | Tone 6 Frequency = 600 kHz (i.e., 15 kHz * 2 + 570 kHz) | +7.5 kHz |
| RB3 | Tone 6 Frequency = 870 kHz (i.e., 15 kHz * 4 + 810 kHz = 870 kHz) | −22.5 kHz (NOT COMPATIBLE WITH NB-IOT) |

TABLE T-4-continued

| 5G NR Resource Block | Compatible Tone/Frequency | Frequency Offset from NB-IOT |
| --- | --- | --- |
| RB4 | Tone 6 Frequency = 1095 kHz (i.e., 15 kHz * 3 + 1050 kHz) | +2.5 kHz |

Figure 14:
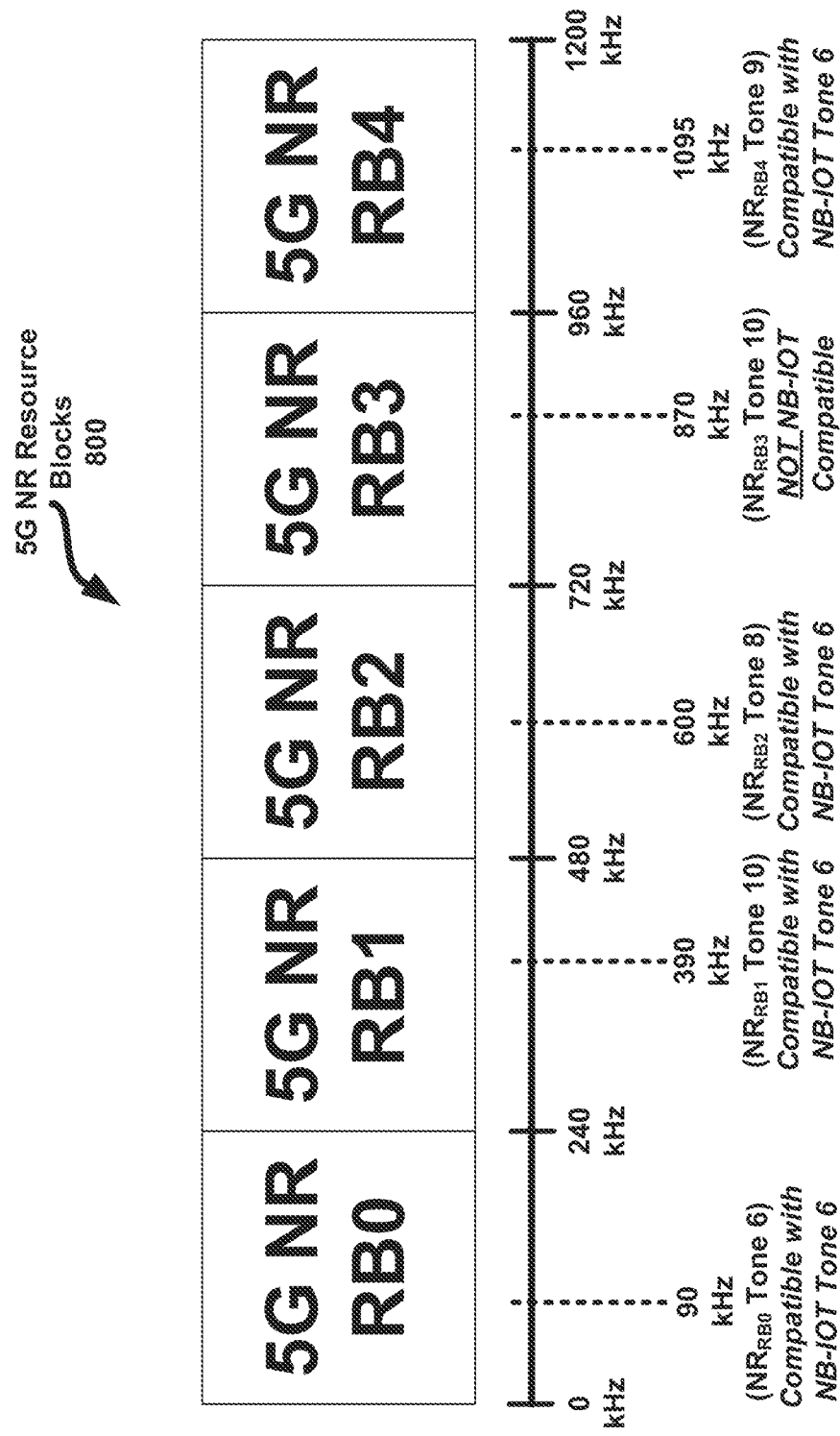
FIG. 14 is a block diagram illustrating an NB-IOT compatibility of various exemplary 5G NR resource blocks in accordance with an embodiment.

Referring next to FIG. 14, a block diagram is provided illustrating the NB-IOT compatibility results of the five exemplary 5G NR resource blocks 800 included in Table T-4, whereas FIGS. 15-19 are schematic diagrams respectively showing the individual tone alignments of each of the five 5G NR resource blocks 800 relative to their corresponding NB-IOT resource blocks.

Figure 15:
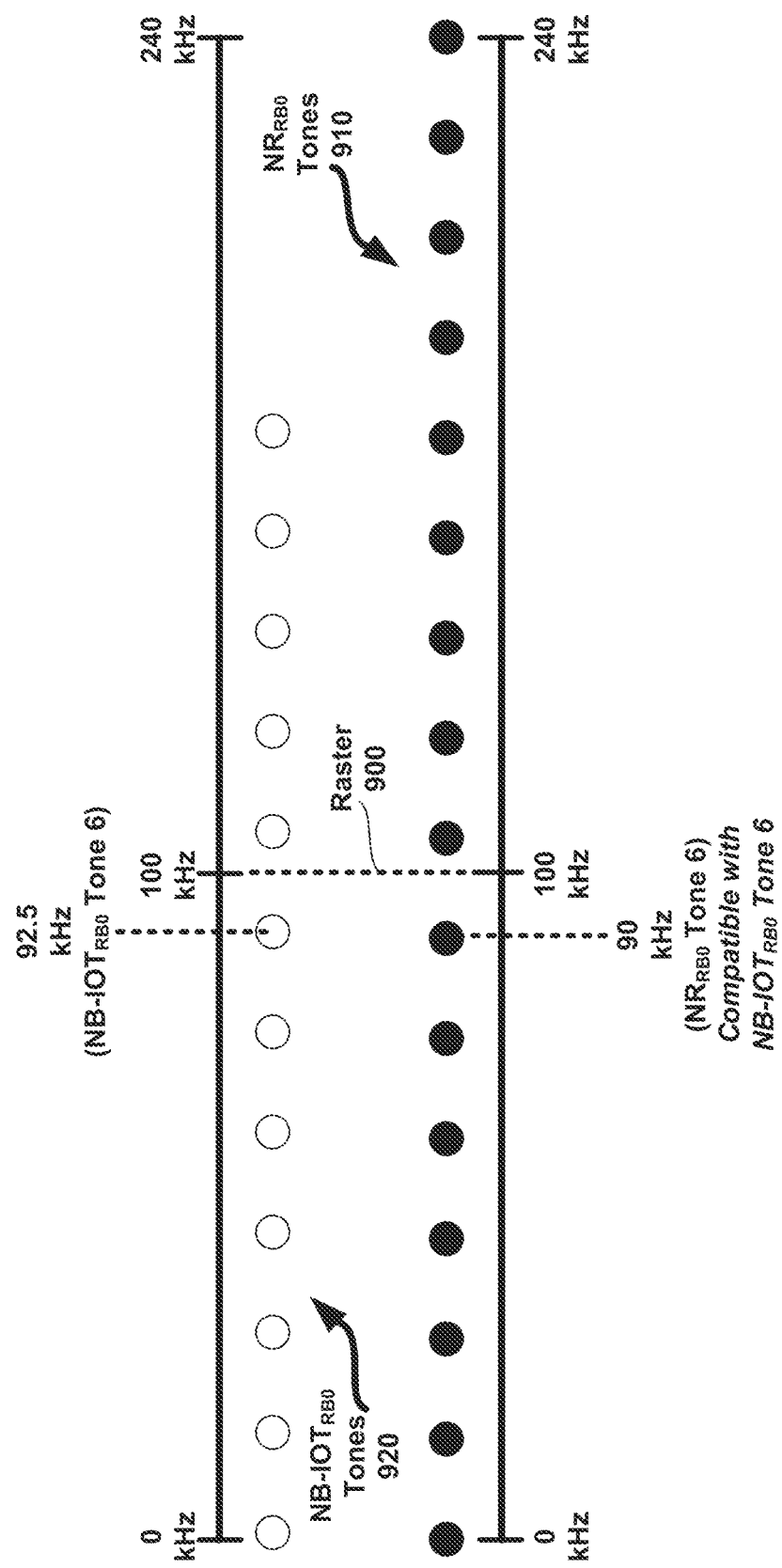
FIG. 15 is a schematic diagram illustrating the NB-IOT compatibility of the first 5G NR resource block illustrated in FIG. 14.

In FIG. 15, for instance, the NB-IOT$_{RB0}$ Tones 920 are aligned with the NR$_{RB0}$ Tones 910 such that the sixth NR$_{RB0}$ tone is aligned with the sixth NB-IOT$_{RB0}$ tone. Here, a shifting of the channel raster 900 by the −2.5 kHz offset ensures that each of the NR$_{RB0}$ and NB-IOT$_{RB0}$ synchronization signals are within 7.5 kHz from the channel raster 900.

Figure 16:
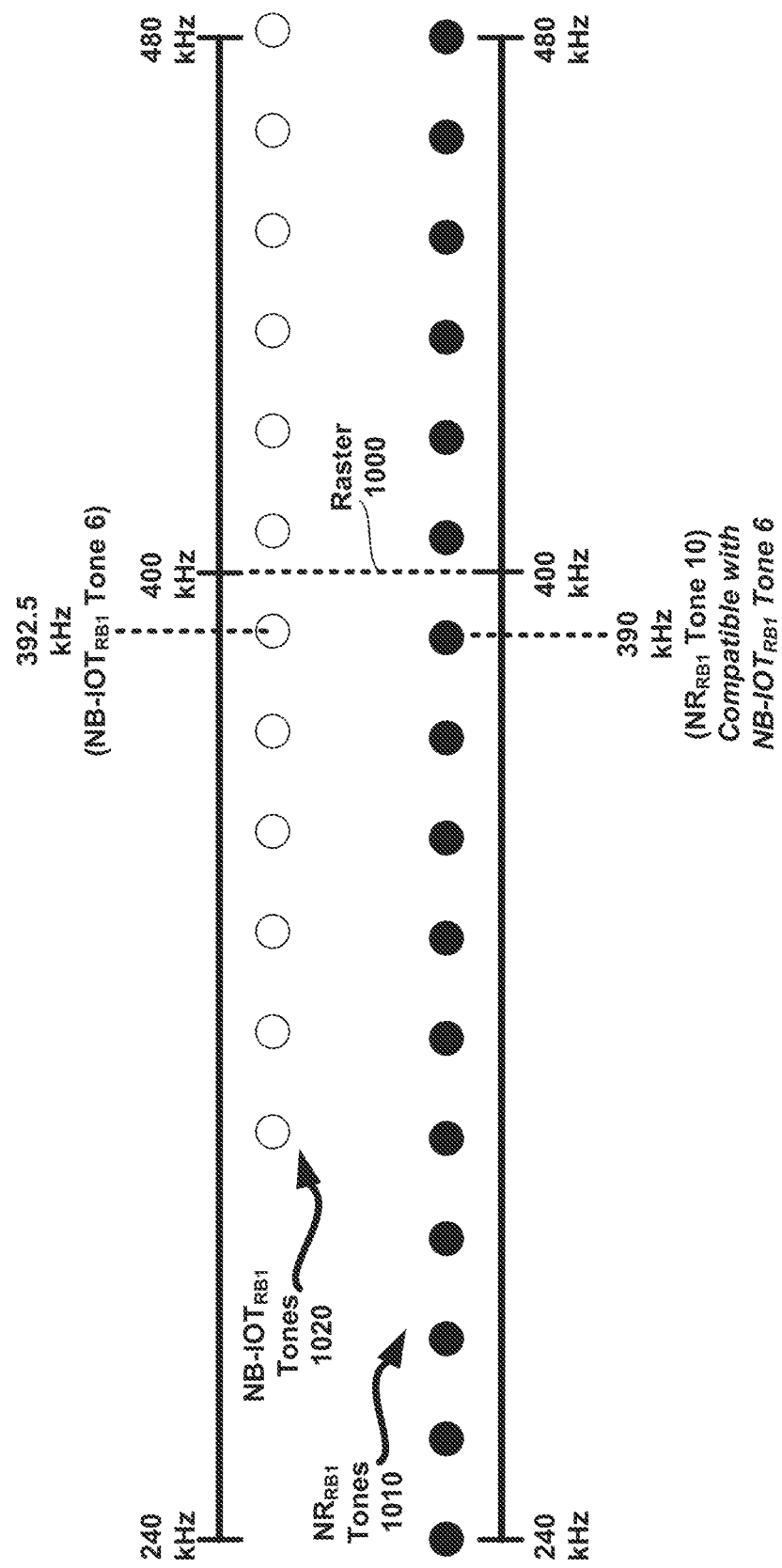
FIG. 16 is a schematic diagram illustrating the NB-IOT compatibility of the second 5G NR resource block illustrated in FIG. 14.

In FIG. 16, however, the NB-IOT$_{RB1}$ Tones 1020 are aligned with the NR$_{RB1}$ Tones 1010 such that the tenth NR$_{RB1}$ tone is aligned with the sixth NB-IOT$_{RB1}$ tone. Here, a shifting of the channel raster 1000 by the −2.5 kHz offset ensures that each of the NR$_{RB1}$ and NB-IOT$_{RB1}$ synchronization signals are within 7.5 kHz from the channel raster 1000.

Figure 17:
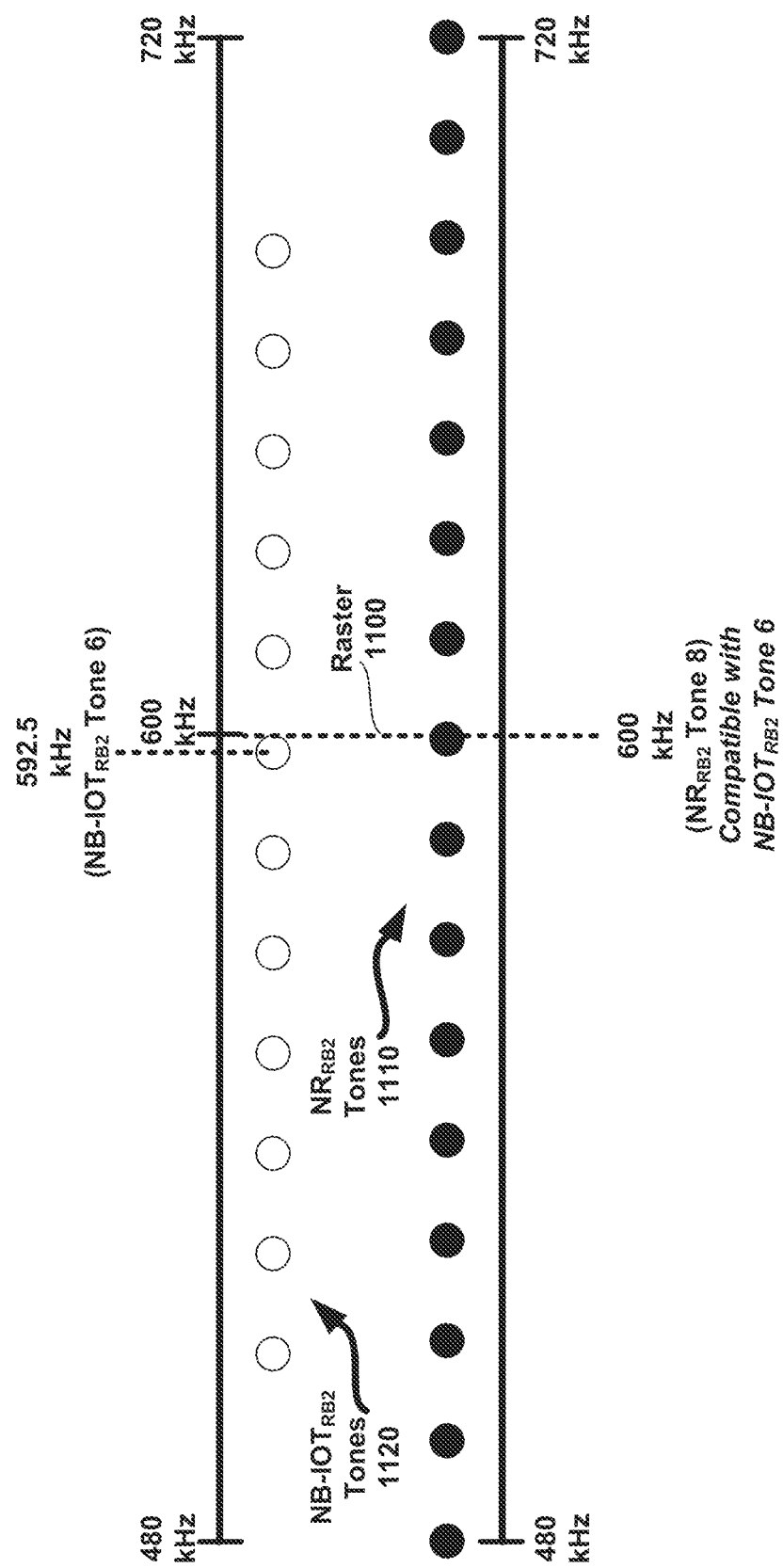
FIG. 17 is a schematic diagram illustrating the NB-IOT compatibility of the third 5G NR resource block illustrated in FIG. 14.

In FIG. 17, the NB-IOT$_{RB2}$ Tones 1120 are aligned with the NR$_{RB2}$ Tones 1110 such that the eighth NR$_{RB2}$ tone is aligned with the sixth NB-IOT$_{RB2}$ tone. Here, a shifting of the channel raster 1100 by the +7.5 kHz offset ensures that each of the NR$_{RB2}$ and NB-IOT$_{RB2}$ synchronization signals are within 7.5 kHz from the channel raster 1100.

Figure 18:
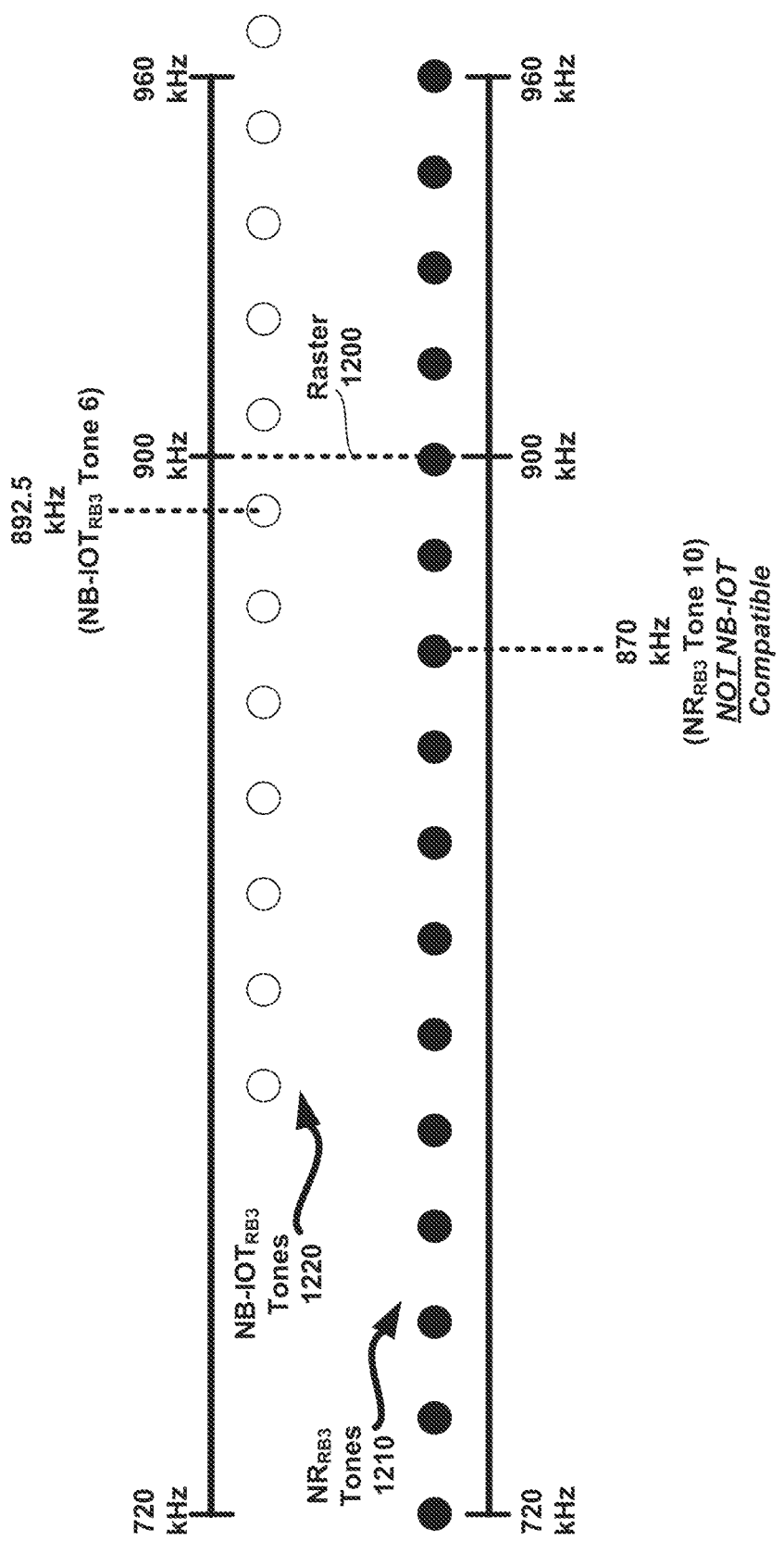
FIG. 18 is a schematic diagram illustrating the NB-IOT incompatibility of the fourth 5G NR resource block illustrated in FIG. 14.

In FIG. 18, however, the 5G NR resource block is incompatible with the NB-IOT resource block. Namely, the NB-IOT$_{RB3}$ Tones 1220 cannot be aligned with the NR$_{RB3}$ Tones 1210 such that any of the sixth, seventh, eighth, ninth, or tenth NR$_{RB3}$ tones are aligned within 7.5 kHz of the sixth NB-IOT$_{RB3}$ tone. Indeed, even if the tenth NR$_{RB3}$ tone is used, the offset between the sixth NB-IOT$_{RB3}$ tone and the tenth NR$_{RB3}$ tone is −22.5 kHz. There is thus no offset that ensures that each of the NR$_{RB3}$ and NB-IOT$_{RB3}$ synchronization signals are within 7.5 kHz from the channel raster 1200.

Figure 19:
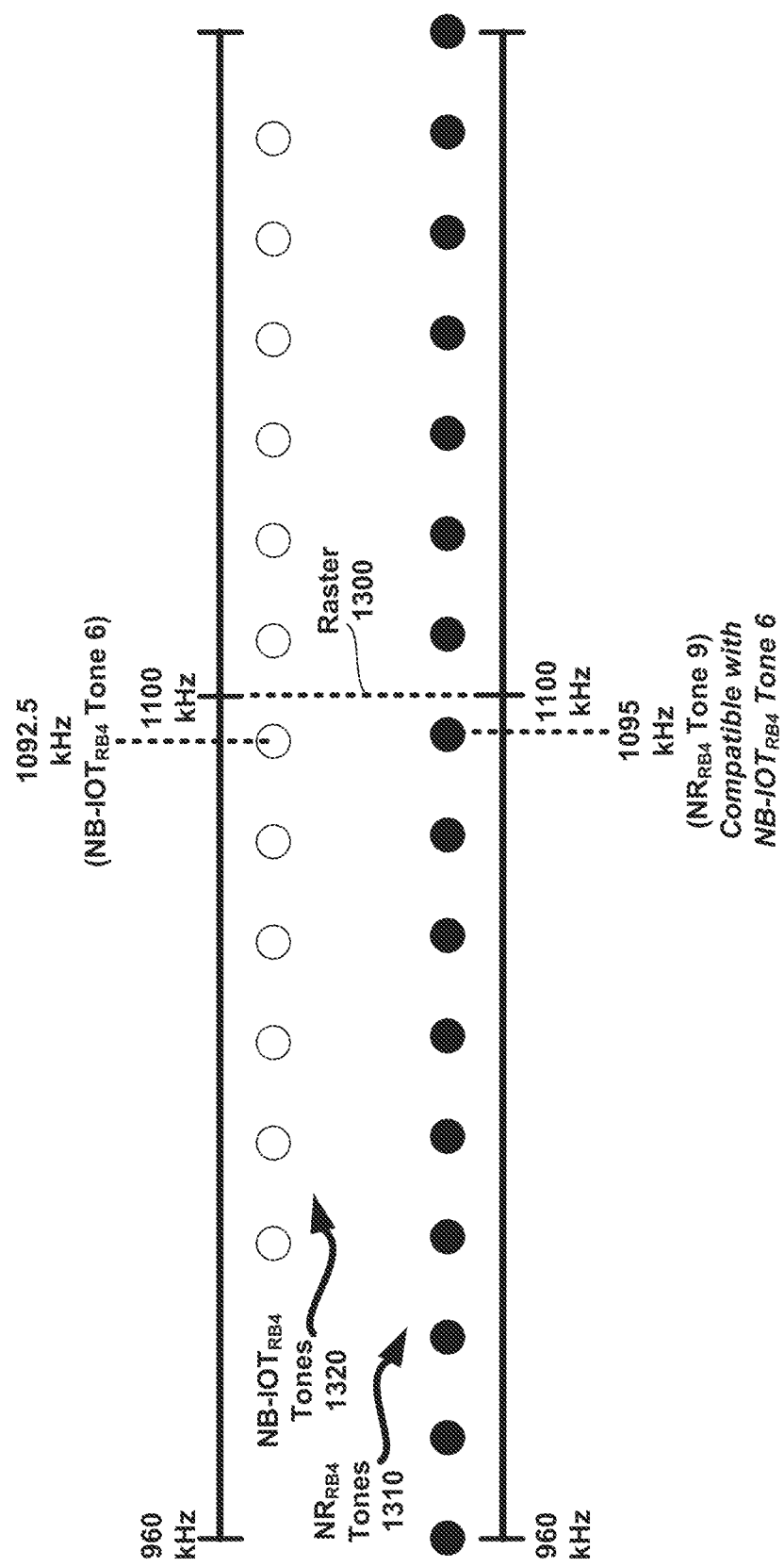
FIG. 19 is a schematic diagram illustrating the NB-IOT compatibility of the fifth 5G NR resource block illustrated in FIG. 14.

In FIG. 19, the NB-IOT$_{RB4}$ Tones 1320 are aligned with the NR$_{RB4}$ Tones 1310 such that the ninth NR$_{RB4}$ tone is aligned with the sixth NB-IOT$_{RB4}$ tone. Here, a shifting of the channel raster 1300 by the +2.5 kHz offset ensures that each of the NR$_{RB4}$ and NB-IOT$_{RB4}$ synchronization signals are within 7.5 kHz from the channel raster 1300.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO).

Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication comprising: defining a first radio access technology (RAT) resource block size for a plurality of adjacent first RAT resource blocks and a second RAT resource block size, wherein a channel raster is set to occur over a frequency spectrum of the plurality of first RAT resource blocks at a predetermined channel raster interval;

for at least one of the plurality of first RAT resource block:
identifying a second RAT resource block that at least partially overlaps in frequency with the first RAT resource block; and determining an offset to be applied to an instance of the channel raster that is otherwise set to occur at the predetermined channel raster interval corresponding to a frequency of the first RAT resource block, wherein the offset places the instance of the channel raster at an interval from a preceding instance of the channel raster, and the interval is different from the predetermined channel raster interval, and provides a compatible alignment of the first RAT resource block and the second RAT resource block, wherein the compatible alignment aligns each of a first RAT synchronization signal and a corresponding second RAT synchronization signal within a threshold offset from the instance of the channel raster that has been offset; and shifting the instance of the channel raster according to the offset.

2. The method of claim 1, wherein the first RAT is a fifth generation (5G) new radio (NR) technology, and wherein the second RAT is a narrow band internet-of-things (NB-IOT) technology.

3. The method of claim 2, wherein individual tones associated with each of a 5G NR resource block size and an NB-IOT resource block size are 15 kHz.

4. The method of claim 1, wherein the first RAT resource block size is greater than the second RAT resource block size.

5. The method of claim 4, wherein the first RAT resource block size is sixteen tones, and wherein the second RAT resource block size is twelve tones.

6. The method of claim 4, further comprising transmitting an enhanced mobile broadband (eMBB) communication via empty first RAT tones, wherein the empty first RAT tones are tones of the first RAT resource block that are unaligned with the second RAT resource block.

7. The method of claim 4, further comprising utilizing at least a portion of energy allocated for empty first RAT tones to increase power in the second RAT tones, wherein the empty first RAT tones are tones of the first RAT resource block that are unaligned with the second RAT resource block.

8. The method of claim 1, further comprising transmitting offset information to a scheduled entity, wherein the offset information facilitates a retrieval of the offset.

9. The method of claim 8, wherein the offset information is included in a bit transmitted via a narrowband physical broadcasting channel (N-PBCH), and wherein the bit facilitates an identification of a channel raster table corresponding to the offset.

10. A wireless communication device comprising: a processor; a memory communicatively coupled to the processor; a transceiver communicatively coupled to the processor; a block size circuitry communicatively coupled to the processor, wherein the block size circuitry is configured to define a first radio access technology (RAT) resource block size for a plurality of adjacent first RAT resource blocks and a second RAT resource block size, wherein a channel raster is set to occur over a frequency spectrum of the plurality of first RAT resource blocks at a predetermined channel raster interval;
an alignment circuitry communicatively coupled to the processor, wherein the alignment circuitry is configured to, for at least one of the plurality of first RAT resource blocks, identify a second RAT resource block that at least partially overlaps in frequency with the first RAT resource block; and
an offset circuitry communicatively coupled to the processor, wherein the offset circuitry is configured to determine an offset to be applied to an instance of the channel raster that is otherwise set to occur at the predetermined channel raster interval corresponding to a frequency of the first RAT resource block, wherein the offset places the instance of the channel raster at an interval from a preceding instance of the channel raster, and the interval is different from the predetermined channel raster interval, and provides a compatible alignment of the first RAT resource block and the second RAT resource block, wherein the compatible alignment aligns each of a first RAT synchronization signal and a corresponding second RAT synchronization signal within a threshold offset from the instance of the channel raster that has been offset; and
shift the instance of the channel raster according to the offset.

11. The wireless communication device of claim 10, wherein the first RAT is a fifth generation (5G) new radio (NR) technology, and wherein the second RAT is a narrowband internet-of-things (NB-IOT) technology.

12. The wireless communication device of claim 11, wherein individual tones associated with each of a 5G NR resource block size and an NB-IOT resource block size are 15 kHz.

13. The wireless communication device of claim 10, wherein the first RAT resource block size is greater than the second RAT resource block size.

14. The wireless communication device of claim 13, wherein the first RAT resource block size is sixteen tones, and wherein the second RAT resource block size is twelve tones.

15. The wireless communication device of claim 13, wherein the processor is further configured to transmit an enhanced mobile broadband (eMBB) communication via empty first RAT tones, and wherein the empty first RAT tones are tones of the first RAT resource block that are unaligned with the second RAT resource block.

16. The wireless communication device of claim 13, wherein the processor is further configured to utilize at least a portion of energy allocated for empty first RAT tones to increase power in the second RAT tones, and wherein the empty first RAT tones are tones of the first RAT resource block that are unaligned with the second RAT resource block.

17. The wireless communication device of claim 10, wherein the processor is further configured to transmit offset information to a scheduled entity, and wherein the offset information facilitates a retrieval of the offset.

18. The wireless communication device of claim 17, wherein the offset information is included in a bit transmitted via a narrowband physical broadcasting channel (N-PBCH), and wherein the bit facilitates an identification of a channel raster table corresponding to the offset.

19. A method of wireless communication comprising:
for at least one first RAT resource block in a plurality of adjacent first RAT resource blocks that spans a frequency spectrum over which a channel raster is set to occur at a predetermined channel raster interval:
identifying a second RAT resource block that at least partially overlaps in frequency with the first RAT resource block;
ascertaining an offset to be applied to an instance of the channel raster that is otherwise set to occur at the predetermined channel raster interval corresponding to a frequency of the first RAT resource block, wherein the offset places the instance of the channel raster at an interval from a preceding instance of the channel raster, and the interval is different from the predetermined channel raster interval, and provides a compatible alignment of the first RAT resource block and the second RAT resource block, wherein the compatible alignment aligns each of a first RAT synchronization signal and a corresponding second RAT synchronization signal within a threshold offset from the instance of the channel raster that has been offset; and
shifting the instance of the channel raster according to the offset.

20. The method of claim 19, wherein the ascertaining of the offset is based on a received communication.

21. The method of claim 20, wherein the ascertaining of the offset comprises retrieving the offset from a channel raster table based on offset information included in the received communication.

22. The method of claim 19, wherein a size of the first RAT resource block is greater than a size of the second RAT resource block.

23. The method of claim 22, wherein the size of the first RAT resource block is sixteen tones, and wherein the size of the second RAT resource block is twelve tones.

24. A wireless communication device comprising:
a processor;
a memory communicatively coupled to the processor;
a transceiver communicatively coupled to the processor; and
an alignment circuitry communicatively coupled to the processor, wherein the alignment circuitry is configured to, for at least one first RAT resource block in a plurality of adjacent first RAT resource blocks that spans a frequency spectrum over which a channel raster is set to occur at a predetermined channel raster interval:
identifying a second RAT resource block that at least partially overlaps in frequency with the first RAT resource block;
ascertain an offset to be applied to an instance of the channel raster that is otherwise set to occur at the predetermined channel raster interval corresponding to a frequency of the first RAT resource block, wherein the offset places the instance of the channel raster at an interval from a preceding instance of the channel raster, and the interval is different from the predetermined channel raster interval, and provides a compatible alignment of the first RAT resource block and the second RAT resource block, wherein the compatible alignment aligns each of a first RAT synchronization signal and a corresponding second RAT synchronization signal within a threshold offset from the instance of the channel raster that has been offset; and shift the instance of the channel raster according to the offset.

25. The wireless communication device of claim 24, wherein the alignment circuitry is configured to ascertain the offset based on a communication received via a narrowband physical broadcasting channel (N-PBCH).

26. The wireless communication device of claim 25, wherein the alignment circuitry is configured to retrieve the offset from a channel raster table identified by a bit included in the communication received via the N-PBCH.

27. The wireless communication device of claim 24, wherein a size of the first RAT resource block is greater than a size of the second RAT resource block.

28. The wireless communication device of claim 27, wherein the processor is further configured to receive an enhanced mobile broadband (eMBB) communication via empty first RAT tones, and wherein the empty first RAT tones are tones of a first RAT resource block that are unaligned with a second RAT resource block.

* * * * *